(12) United States Patent
Zhao et al.

(10) Patent No.: US 10,569,183 B2
(45) Date of Patent: Feb. 25, 2020

(54) INFORMATION PROCESSING SYSTEM, METHOD, AND SYSTEM

(71) Applicant: TENCENT TECHNOLOGY (SHENZHEN) COMPANY LIMITED, Shenzhen (CN)

(72) Inventors: Ming Zhao, Shenzhen (CN); Yong Yang, Shenzhen (CN); Sixi Lu, Shenzhen (CN); Yanqing Jing, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 97 days.

(21) Appl. No.: 15/844,066

(22) Filed: Dec. 15, 2017

(65) Prior Publication Data
US 2018/0104607 A1    Apr. 19, 2018

Related U.S. Application Data

(63) Continuation of application No. PCT/CN2016/098974, filed on Sep. 14, 2016, which
(Continued)

(30) Foreign Application Priority Data

Oct. 19, 2015 (CN) .......................... 2015 1 0677665
Oct. 19, 2015 (CN) .......................... 2015 1 0681286
Oct. 19, 2015 (CN) .......................... 2015 1 0682729

(51) Int. Cl.
*A63H 17/36* (2006.01)
*G08C 17/02* (2006.01)
(Continued)

(52) U.S. Cl.
CPC ............. *A63H 17/36* (2013.01); *A63H 17/14* (2013.01); *A63H 17/26* (2013.01); *A63H 29/22* (2013.01);
(Continued)

(58) Field of Classification Search
CPC ...... A63F 13/04; A63H 2200/00; A63H 17/14
See application file for complete search history.

(56) References Cited

U.S. PATENT DOCUMENTS 3,602,640 A * 8/1971 Maillet .................. H04N 5/257
                                                348/197
5,904,621 A * 5/1999 Small ...................... F41A 33/02
                                                434/22
(Continued)

FOREIGN PATENT DOCUMENTS

CN        1479079 A       3/2004
CN        2699235 Y       5/2005
(Continued)

OTHER PUBLICATIONS

The World Intellectual Property Organization (WIPO) International Search Report for PCT/CN2016/098974 dated Dec. 22, 2016 8 Pages (including translation).
(Continued)

*Primary Examiner* — Reginald A Renwick
(74) *Attorney, Agent, or Firm* — Anova Law Group, PLLC

(57) ABSTRACT

The present disclosure discloses an information processing system. The system includes at least two toy battle devices and control devices corresponding to the toy battle devices. A first control device is configured to send attack information to a first toy battle device. The first toy battle device is configured to modulate the attack information into a laser signal, and emit the laser signal. A second toy battle device
(Continued)

is configured to receive the laser signal by using a laser receiving component, and obtain the attack information by demodulating the laser signal by using a demodulation circuit; and send the attack information to a second control device; determine an attacked status of the second toy battle device according to the attack information; and send a feedback instruction to the second toy battle device, the feedback instruction indicating the attacked status of the second toy battle device.

20 Claims, 22 Drawing Sheets

Related U.S. Application Data is a continuation of application No. PCT/CN2016/098973, filed on Sep. 14, 2016, which is a continuation of application No. PCT/CN2016/098939, filed on Sep. 14, 2016.

(51) Int. Cl.
*A63H 29/22* (2006.01)
*A63H 17/26* (2006.01)
*A63H 17/14* (2006.01)
*H04B 10/66* (2013.01)
*H04B 10/50* (2013.01)
*H04B 10/114* (2013.01)

(52) U.S. Cl.
CPC .......... *G08C 17/02* (2013.01); *A63H 2200/00* (2013.01); *H04B 10/114* (2013.01); *H04B 10/503* (2013.01); *H04B 10/66* (2013.01)

(56) References Cited

U.S. PATENT DOCUMENTS

| | | | |
|---|---|---|---|
| 5,917,634 A | 6/1999 | Otobe | |
| 6,248,019 B1 | 6/2001 | Mudie et al. | |
| 6,814,667 B2 * | 11/2004 | Jeffway, Jr. | F41G 3/2666 446/175 |
| 2003/0232649 A1 | 12/2003 | Gizis et al. | |
| 2004/0085646 A1 | 5/2004 | Tacklind et al. | |
| 2005/0186884 A1 * | 8/2005 | Evans | A63H 17/14 446/456 |
| 2011/0183300 A1 | 7/2011 | McNeish et al. | |
| 2012/0327662 A1 | 12/2012 | Dang et al. | |
| 2015/0117011 A1 | 4/2015 | Wu et al. | |

FOREIGN PATENT DOCUMENTS

| | | | |
|---|---|---|---|
| CN | 2801235 Y | 8/2006 | |
| CN | 1933372 A | 3/2007 | |
| CN | 2899885 Y | 5/2007 | |
| CN | 101058028 A | 10/2007 | |
| CN | 200984453 Y | 12/2007 | |
| CN | 201673286 U | 12/2010 | |
| CN | 102346034 A | 2/2012 | |
| CN | 102394697 A | 3/2012 | |
| CN | 202281608 U | 6/2012 | |
| CN | 102553223 A | 7/2012 | |
| CN | 102608685 A | 7/2012 | |
| CN | 102836549 A | 12/2012 | |
| CN | 202605721 U | 12/2012 | |
| CN | 103093606 A | 5/2013 | |
| CN | 203060776 U | 7/2013 | |
| CN | 103263776 A | 8/2013 | |
| CN | 103392274 A | 11/2013 | |
| CN | 103792653 A | 5/2014 | |
| CN | 105279947 A | 1/2016 | |
| CN | 105391495 A | 3/2016 | |
| CN | 105391499 A | 3/2016 | |
| JP | H0712498 A | 1/1995 | |
| JP | 2006352105 A | 12/2006 | |
| JP | 2007214669 A | 8/2007 | |
| KR | 20090096123 A | 9/2009 | |

OTHER PUBLICATIONS

The World Intellectual Property Organization (WIPO) International Search Report for PCT/CN2016/098973 dated Dec. 20, 2016 8 Pages (including translation).
The World Intellectual Property Organization (WIPO) International Search Report for PCT/CN2016/098939 dated Dec. 15, 2016 8 Pages (including translation).
The State Intellectual Property Office of the People's Republic of China (SIPO) Office Action 1 for 201510682729.6 dated Oct. 31, 2016 7 Pages (including translation).
The State Intellectual Property Office of the People's Republic of China (SIPO) Office Action 1 for 201510677665.0 Aug. 5, 2016 7 Pages (including translation).
The State Intellectual Property Office of the People's Republic of China (SIPO) Office Action 1 for 201510681286.9 dated Aug. 19, 2016 9 Pages (including translation).
The State Intellectual Property Office of the People's Republic of China (SIPO) Office Action 4 for 201510681286.9 dated Jan. 21, 2019 9 Pages (including translation).

\* cited by examiner

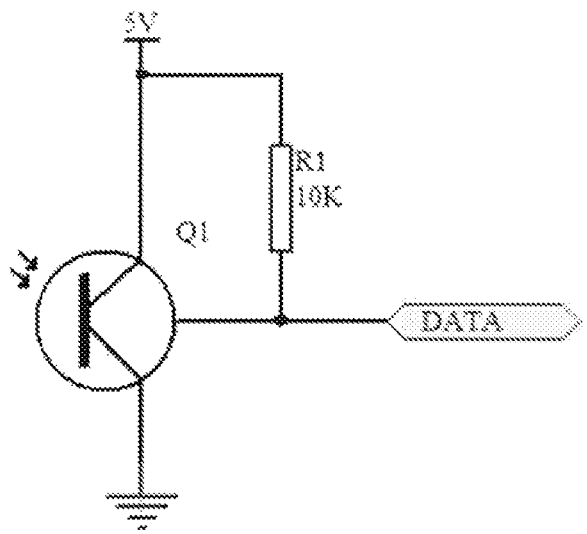
FIG. 3C
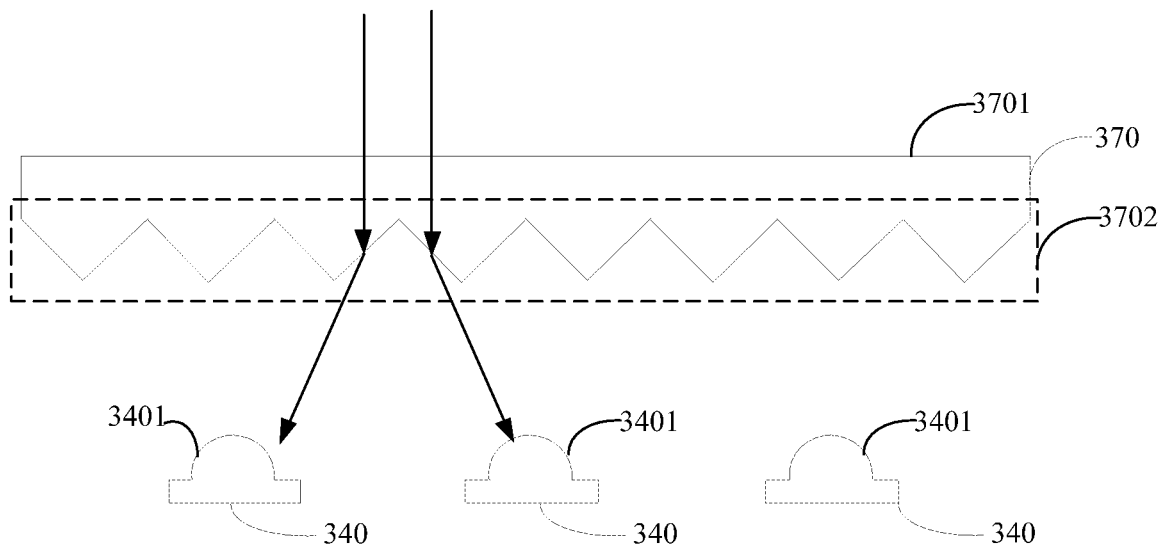
FIG. 3D1

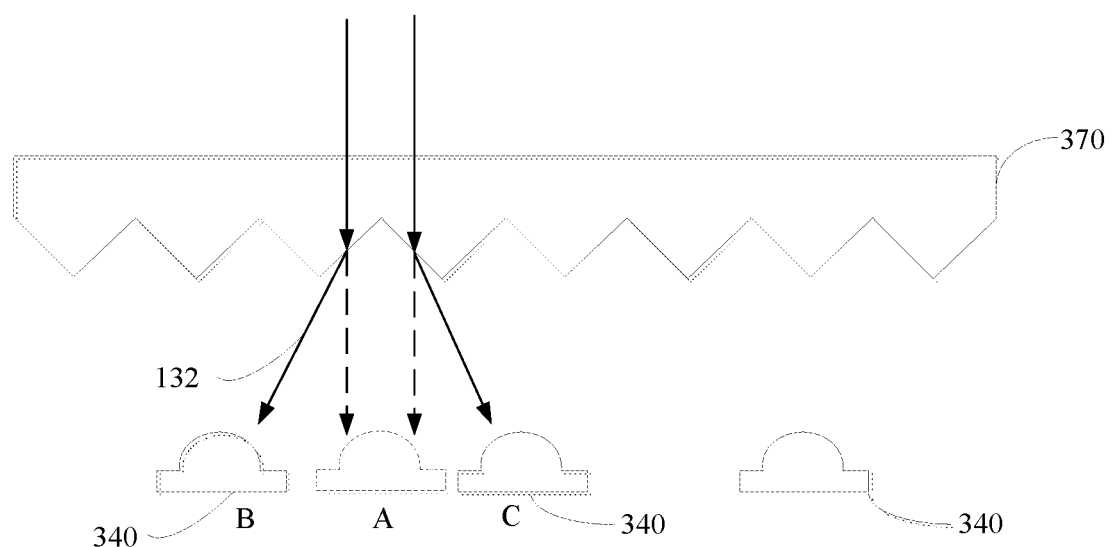
FIG. 3D2

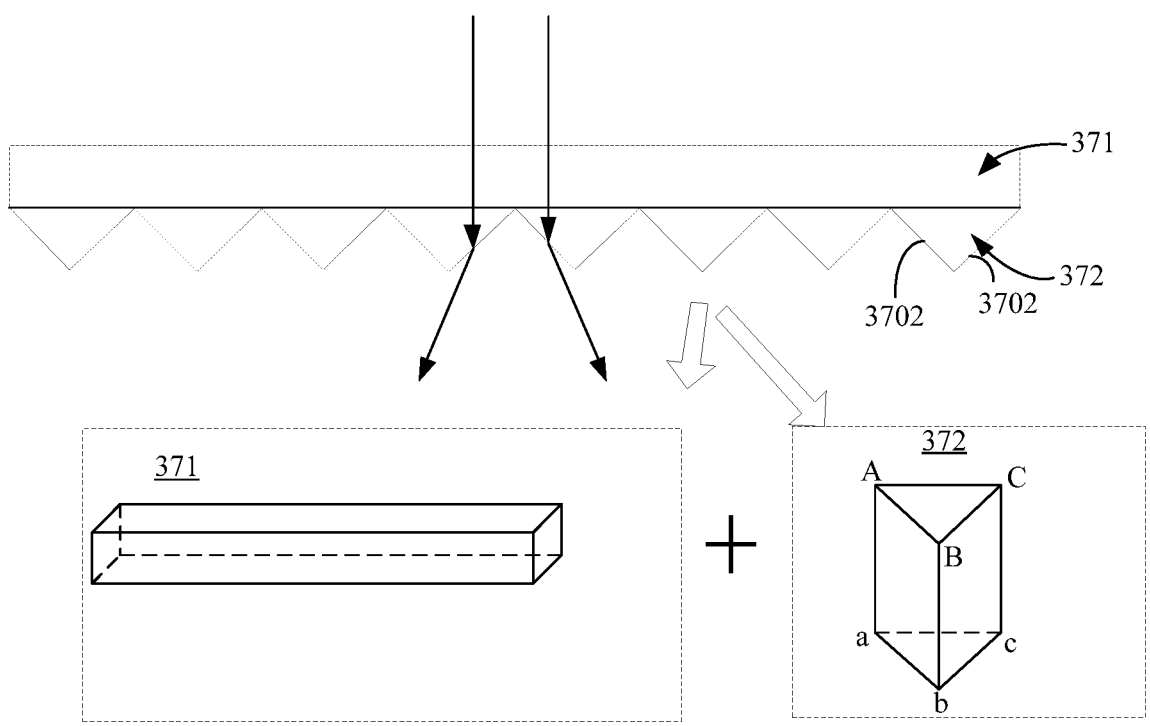
FIG. 3E1

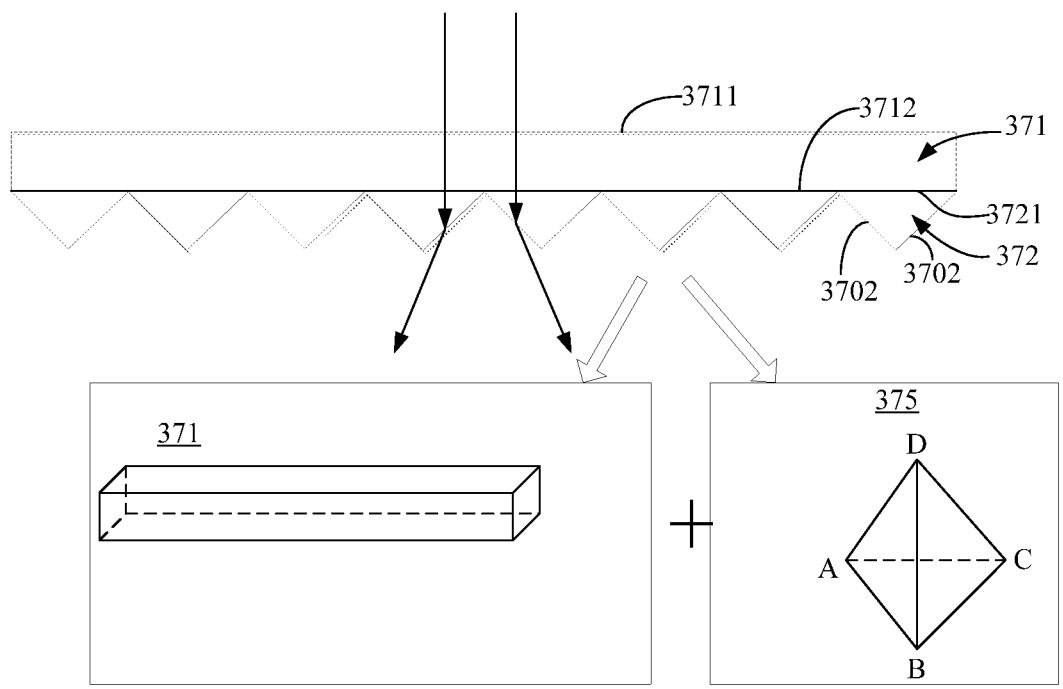
FIG. 3E2

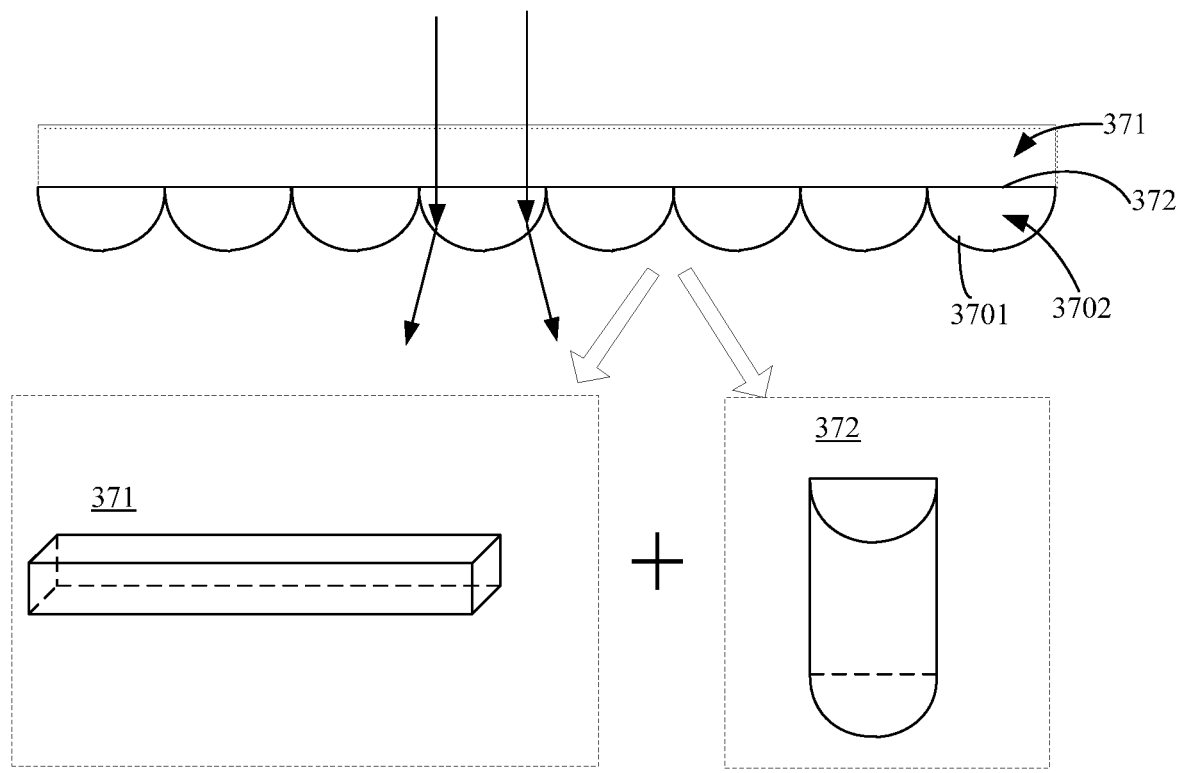
FIG. 3F1

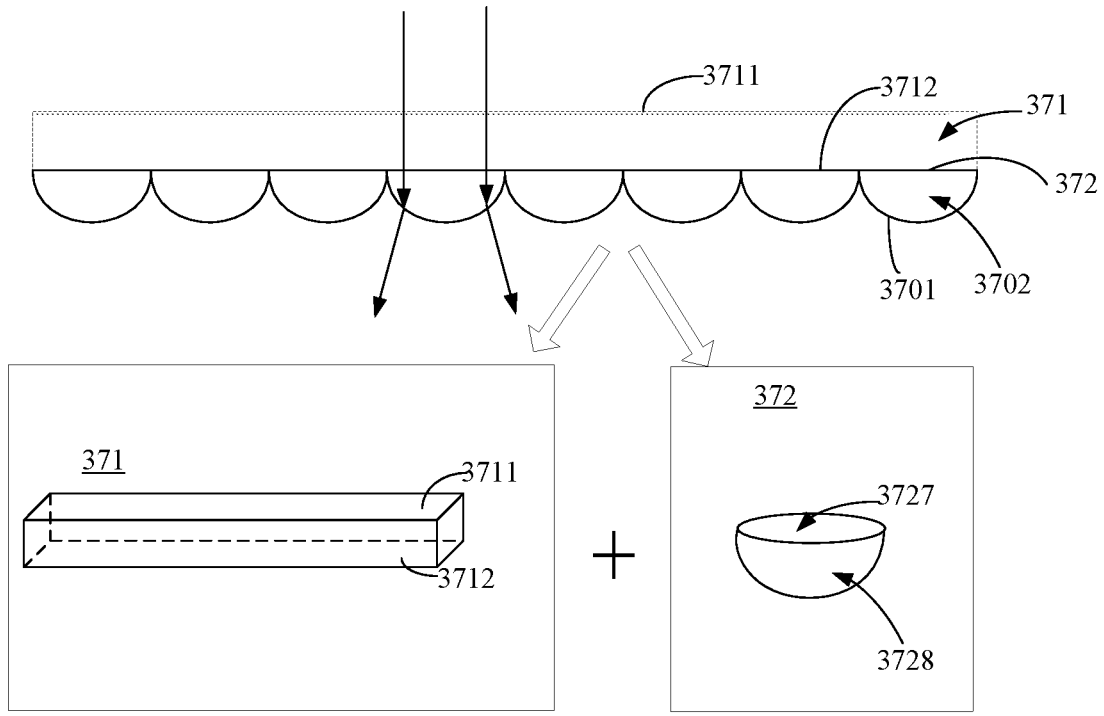
FIG. 3F2
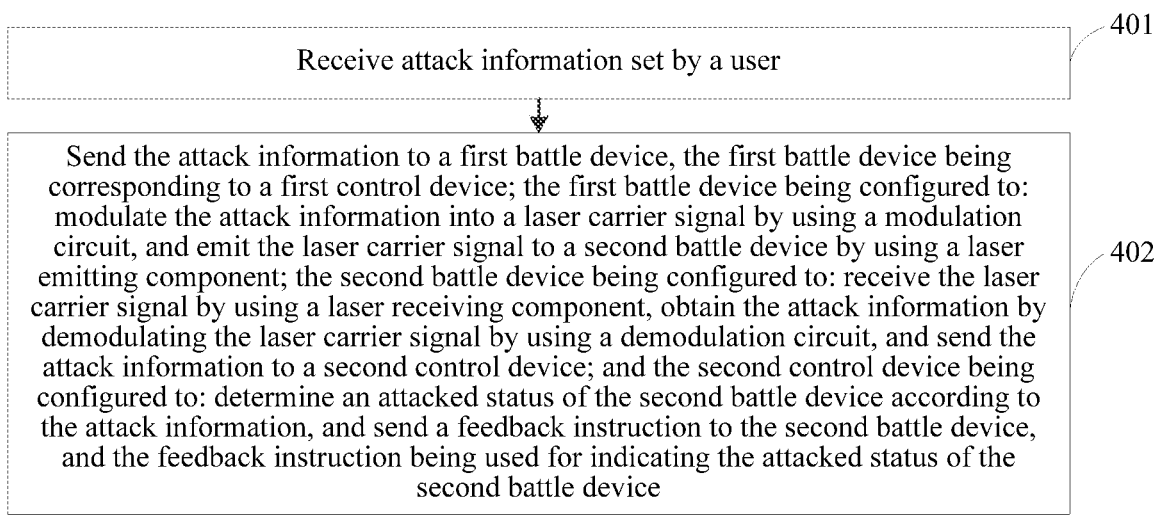
FIG. 4

Receive, by using a laser receiving component, a laser carrier signal sent by a first battle device, the laser carrier signal being emitted by the first battle device by using a laser emitting component, after the first battle device receives attack information sent by a first control device, and modulates the attack information into the laser carrier signal by using a modulation circuit — 601

Obtain the attack information by demodulating the laser carrier signal by using a demodulation circuit, and send the attack information to a second control device — 602

Receive a feedback instruction sent by the second control device according to the attack information, the feedback instruction being used for indicating an attacked status of the second battle device — 603

FIG. 6

Receive attack information sent by a second battle device, the attack information being obtained by the second battle device by demodulating a laser carrier signal by using a demodulation circuit, and the laser carrier signal being emitted by a first battle device by using a laser emitting component, after the first battle device receives the attack information sent by a first control device, and modulates the attack information by using a modulation circuit — 701

Determine an attacked status of the second battle device according to the attack information — 702

Send a feedback instruction to the second battle device, the feedback instruction being used for indicating the attacked status of the second battle device — 703

FIG. 7

INFORMATION PROCESSING SYSTEM, METHOD, AND SYSTEM

RELATED APPLICATION

This application claims priority to PCT Application No. PCT/CN2016/098974, filed on Sep. 14, 2016, which claims priority to Chinese Patent Application No. 201510681286.9, filed with the Chinese Patent Office on Oct. 19, 2015 and entitled "LASER EMITTING APPARATUS, LASER RECEIVING APPARATUS, AND TOY BATTLE DEVICE." Both applications are incorporated herein by reference in their entirety.

This application further claims priority to PCT Application No. PCT/CN2016/098973, filed on Sep. 14, 2016, which claims priority to Chinese Patent Application No. 201510677665.0, filed with the Chinese Patent Office on Oct. 19, 2015 and entitled "LASER RECEIVING STRUCTURE, TOY BATTLE DEVICE HOUSING, AND TOY BATTLE DEVICE." Both applications are incorporated herein by reference in their entirety.

The application claims priority to PCT Application No. PCT/CN2016/098939, filed on Sep. 14, 2016, which claims priority to China Patent Application No. 201510682729.6, filed with the Chinese Patent Office on Oct. 19, 2015 and entitled "INFORMATION PROCESSING SYSTEM, METHOD, AND APPARATUS." Both applications are incorporated herein by reference in their entirety.

FIELD OF THE TECHNOLOGY

Embodiments of the present disclosure relate to the field of data communication, and in particular, to an information processing system, method, and apparatus used with optical structures, and in particular, with a laser emitting apparatus, a laser receiving apparatus, and a toy battle device.

BACKGROUND OF THE DISCLOSURE

With the development of the remote control technology, users can control toy battle devices to battle against each other by using a dedicated radio frequency remote controller. The toy battle devices may be an intelligent battle toy car, an intelligent battle toy plane, and the like.

When a user uses a dedicated radio frequency remote controller to control toy battle devices to battle against each other, the user may press specified keys on the radio frequency remote controller, and trigger the radio frequency remote controller to send an attack instruction to a corresponding toy battle device. After receiving the attack instruction, the toy battle device may simulate an attack by means of an infrared ray. After receiving the infrared ray, another toy battle device may automatically simulate an attacked status, and perform actions such as turning over and stopping.

Often if the radio frequency remote controller sends a monotonous attack instruction to a toy battle device, and consequently, the toy battle device has a monotonous attack form, and an attacked toy battle device can only automatically perform a simple and pre-determined action according to a preset logic, resulting in a poor effect of a simulated battle. In addition, because the infrared ray has strong scattering property, a false hit probability is relatively high if the toy battle devices simulate attacks by means of the infrared ray.

SUMMARY

To resolve the problems existing in the foregoing technology, embodiments of the present disclosure provide an information processing system, method, and apparatus. The technical solutions are described as follows.

According to a first aspect of the embodiments of the present disclosure, an information processing system is provided, the system including at least two toy battle devices and control devices respectively corresponding to the toy battle devices. A first control device is configured to send attack information to a first toy battle device. The first toy battle device further is configured to modulate the attack information into a laser signal by using a modulation circuit, and emit the laser signal through a laser emitting component. And, a second toy battle device is configured to receive the laser signal by using a laser receiving component, and obtain the attack information by demodulating the laser signal by using a demodulation circuit; and send the attack information to a second control device; determine an attacked status of the second toy battle device according to the attack information; and send a feedback instruction to the second toy battle device, the feedback instruction indicating the attacked status of the second toy battle device.

Another aspect of the present disclosure provides a laser emitting apparatus, the apparatus comprising a laser emitting component and a wide-angle reflective surface component, and a laser emitting direction of the laser emitting component being the same as a laser incident direction of the wide-angle reflective surface component. The laser emitting component is configured to emit laser to the wide-angle emitting surface component in the laser emitting direction; and the wide-angle reflective surface component is configured to receive the laser emitted by the laser emitting component in the laser emitting direction, and reflect the laser in at least two laser emergent directions.

Another aspect of the present disclosure provides a laser receiving apparatus, the apparatus comprising a wide-angle reflective surface component and a laser receiving component, and a laser emergent direction of the wide-angle reflective surface component being the same as a laser receiving direction of the laser receiving component; the wide-angle reflective surface component being configured to reflect laser that is from at least two laser incident directions, in the same laser emergent direction; and the laser receiving component being configured to receive, in the laser receiving direction, the laser reflected by the wide-angle reflective surface component.

Another aspect of the present disclosure provides a laser receiving structure, the laser receiving structure comprising a light scattering component and at least one laser receiving component. The light scattering component comprises a light inlet surface and a light outlet surface, and the light scattering component being configured to scatter out, from the light outlet surface, laser injected into the light inlet surface; the light inlet surface corresponds to an incident direction of the laser; a receive end of the at least one laser receiving component corresponds to the light outlet surface; and the light outlet surface comprising protrusion structures arranged in an array.

The technical solutions provided in the embodiments of the present disclosure have the following beneficial effects. A first control device sends attack information to a corresponding first toy battle device, the first toy battle device modulates the attack information into a laser signal for emitting, a second toy battle device that receives the laser signal sends the attack information that is obtained by means of demodulation, to a corresponding second control device, and the second control device indicates, according to the attack information, that the second control device is in a corresponding attacked status. Problems existing in the existing technology that a toy battle device has a monotonous attack form and a relatively high false hit probability are resolved. Compared with a conventional attack instruction transmitted by an infrared ray, in the embodiments of the present disclosure, toy battle devices transmit attack information to each other by using a laser signal, the data volume carried in the laser signal is larger, and attack forms of the toy battle devices are enriched. In addition, laser has a small divergence angle and is not easily affected by ambient light, so that a false hit probability caused by diffuse reflection may be significantly decreased.

BRIEF DESCRIPTION OF THE DRAWINGS

To describe the technical solutions in the embodiments of the present disclosure more clearly, the following briefly describes the accompanying drawings required for describing the embodiments. Obviously, the accompanying drawings in the following description show merely some embodiments of the present disclosure, and a person of ordinary skill in the art may still derive other drawings from these accompanying drawings without creative efforts.

FIG. 3C is a schematic diagram of a laser receiving circuit according to an embodiment of the present disclosure;

FIG. 3D1 is a schematic diagram of a laser receiving structure according to an embodiment of the present disclosure;

FIG. 3D2 is a schematic diagram of a laser projection range of the laser receiving structure;

FIG. 3E1 is a schematic diagram of a light scattering component in a laser receiving structure according to an embodiment of the present disclosure;

FIG. 3E2 is a schematic structural diagram of a light scattering component of a laser receiving structure according to another embodiment of the present disclosure;

FIG. 3F1 is a schematic diagram of a light scattering component in a laser receiving structure according to an embodiment of the present disclosure;

FIG. 3F2 is a schematic structural diagram of a light scattering component of a laser receiving structure according to yet another embodiment of the present disclosure.

FIG. 4 is a flowchart of an information processing method according to an embodiment of the present disclosure;

FIG. 6 is a flowchart of an information processing method according to still another embodiment of the present disclosure;

FIG. 7 is a flowchart of an information processing method according to yet another embodiment of the present disclosure;

DESCRIPTION OF EMBODIMENTS

To make the objectives, technical solutions, and advantages of the present disclosure clearer, the following further describes the implementations of the present disclosure in detail with reference to the accompanying drawings.

The laser modulation carrier emission technology may be used in the field of device control. For example, when a device A transmits data to a device B by using laser, the device A modulates the laser according to the data that needs to be transmitted, and emits the modulated laser to the device B by using a laser emitting apparatus. After receiving the laser by using a laser receiving apparatus, the device B demodulates the laser to obtain data carried in the laser.

Figure 1:
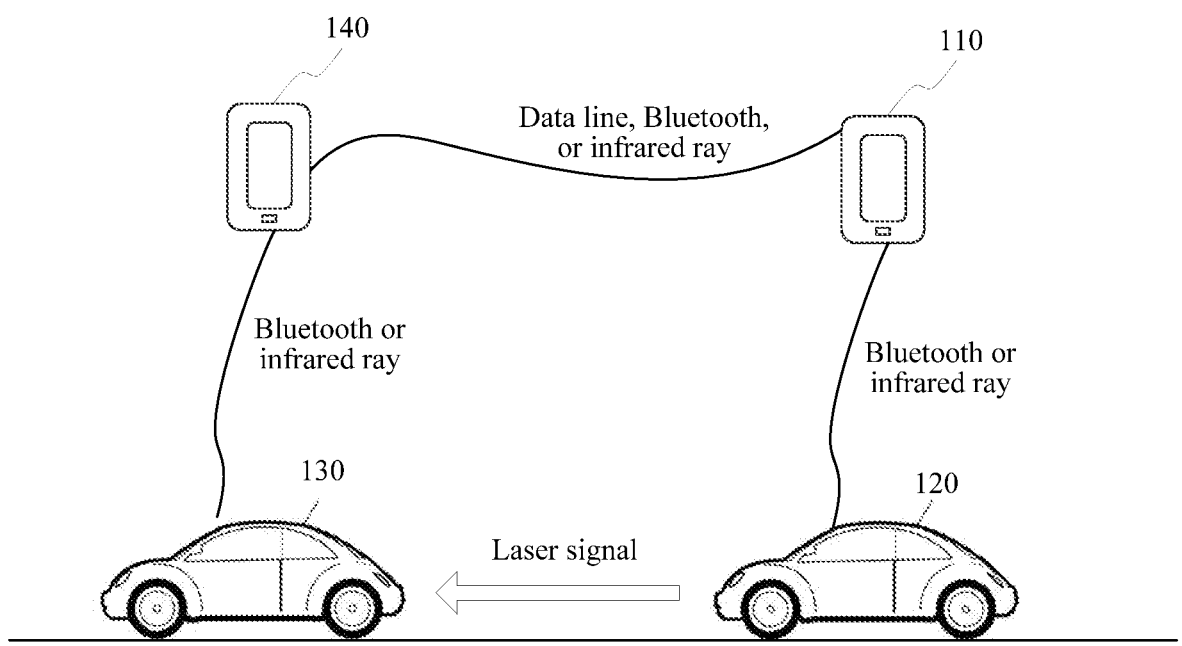
FIG. 1 is a schematic structural diagram of an information processing system according to an embodiment of the present disclosure.

Referring to FIG. 1, FIG. 1 is a schematic structural diagram of an information processing system according to an embodiment of the present disclosure. The system includes a first control device 110, a first toy battle device 120, a second toy battle device 130, and a second control device 140.

The first control device 110 and the second control device 140 each run application programs used for controlling a toy battle device. The first control device 110 is configured to control the first toy battle device 120, and the second control device 140 is configured to the second toy battle device 130. The first control device 110 and the second control device 120 may be a smartphone, a tablet computer, an e-book reader, a moving picture experts group audio layer III (MP3) player, a moving picture experts group audio layer IV (MP4) player, a laptop portable computer, and the like. FIG. 1 provides an example in which the first control device 110 and the second control device 140 each are a smartphone, and the present disclosure is not limited thereto.

The first control device 110 and the first toy battle device 120 may be connected by means of Bluetooth, an infrared ray, and the like, and perform information transmission by means of the wireless connection. Correspondingly, the second control device 140 and the second toy battle device 130 are connected by means of Bluetooth, an infrared ray, and the like, and perform information transmission by means of the wireless connection. It should be noted that the first control device 110 and the second control device 140 can also be connected by using a data line or by means of Bluetooth and an infrared ray.

The first toy battle device 120 and the second toy battle device 130 may be toy battle devices provided with a laser receiving component and a laser emitting component. The laser receiving component is configured to receive a laser signal, and the laser emitting component is configured to emit a laser signal. The first toy battle device 120 and the second toy battle device 130 are further provided with a laser modulation circuit ("modulation circuit" for short) and a laser demodulation circuit ("demodulation circuit" for short). The laser modulation circuit is configured to modulate information into a laser signal, and the laser demodulation circuit is configured to obtain attack information by demodulating the laser signal. The first toy battle device 120 and the second toy battle device 130 may be an intelligent battle toy car, an intelligent battle toy tank, an intelligent toy warship, an intelligent battle toy plane, or the like. FIG. 1 describes an example in which the first toy battle device 120 and the second toy battle device 130 each are intelligent battle toy cars, and the present disclosure is not limited thereto.

It should be noted that in this embodiment, example is described in which the information processing system includes two toy battle devices. In an actual implementation process, the information processing system may further include two or more toy battle devices, and the quantity of toy battle devices is not limited in the present disclosure.

Figure 2:
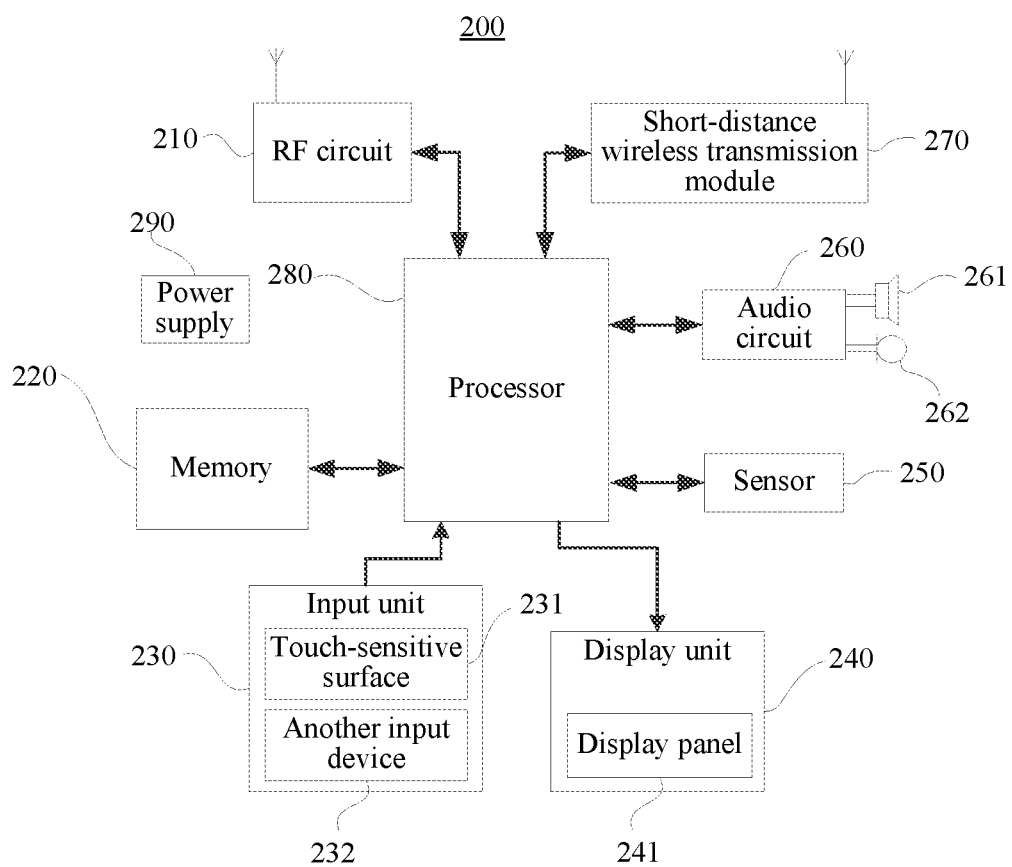
FIG. 2 is a schematic structural diagram of a control device according to an embodiment of the present disclosure.

FIG. 2 is a schematic structural diagram of a control device according to an embodiment of the present disclosure. The control device may be the first control device 120 or the second control device 140 shown in FIG. 1.

The control device 200 may include components, such as a radio frequency (RF) circuit 210, a memory 220 including one or more computer readable storage media, an input unit 230, a display unit 240, a sensor 250, an audio circuit 260, a short-distance wireless transmission module 270, a processor 280 including one or more processing cores, and a power supply 290. A person skilled in the art may understand that the structure of the control device shown in FIG. 2 does not constitute a limitation to the control device, and the control device may include more components or fewer components than those shown in the figure, or some components may be combined, or a different component deployment may be used.

The RF circuit 210 may be configured to receive and send signals during an information receiving and sending process or a call process. Particularly, after the RF circuit 210 receives downlink information from a base station, the RF circuit 210 delivers the downlink information to one or more processors 280 for processing, and sends related uplink data to the base station. Usually, the RF circuit 210 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 210 may also communicate with a network and another device by means of wireless communication. The wireless communication may use any communications standard or protocol, which includes, but is not limited to, a Global System for Mobile Communications (GSM), a General Packet Radio Service (GPRS), Code Division Multiple Access (CDMA), Wideband Code Division Multiple Access (WCDMA), Long Term Evolution (LTE), an e-mail, and a Short Messaging Service (SMS).

The memory 220 may be configured to store a software program and a module. The processor 280 runs the software program and the module stored in the memory 220, to implement various functional applications and data processing. The memory 220 may mainly include a program storage area and a data storage area. The program storage area may store an operating system, an application program required by at least one function (such as a sound playback function and an image display function), and the like. The data storage area may store data (such as audio data and an address book) created according to use of the control device 200, and the like. In addition, the memory 220 may include a high speed random access memory, and may also include a non-volatile memory, such as at least one magnetic disk storage device, a flash memory, or another volatile solid-state storage device. Correspondingly, the memory 220 may further include a memory controller, to provide the processor 280 and the input unit 230 accesses to the memory 220. Although FIG. 2 shows the RF circuit 210, it may be understood that, the RF circuit 210 does not belong to a necessary constitution of the control device 200, and can be ignored according to requirements and within the scope of the essence of the present disclosure.

The input unit 230 may be configured to receive input digit or character information, and generate a keyboard, mouse, joystick, optical, or track ball signal input related to the user setting and function control. Specifically, the input unit 230 may include a touch-sensitive surface 231 and another input device 232. The touch-sensitive surface 231, which may also be referred to as a touch display screen or a touch panel, may collect a touch operation of a user on or near the touch-sensitive surface (such as an operation of a user on or near the touch-sensitive surface 231 by using any suitable object or attachment, such as a finger or a touch pen), and drive a corresponding connection apparatus according to a preset program. Optionally, the touch-sensitive surface 231 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 280. Moreover, the touch controller can receive and execute a command sent by the processor 280. In addition, the touch-sensitive surface 231 may be a resistive, capacitive, infrared, or surface sound wave type touch-sensitive surface. In addition to the touch-sensitive surface 231, the input unit 230 may further include another input device 232. Specifically, the another input device 232 may include, but is not limited to, one or more of a physical keyboard, a functional key (such as a volume control key or a switch key), a track ball, a mouse, and a joystick.

The display unit 240 may be configured to display information input by the user or information provided for the user, and various graphical user interfaces of the control device 200. The graphical user interfaces may be formed by a graph, a text, an icon, a video, and any combination thereof. The display unit 240 may include a display panel 241. Optionally, the display panel 241 may be configured by using a liquid crystal display (LCD), an organic light-emitting diode (OLED), or the like. Further, the touch-sensitive surface 231 may cover the display panel 241. After detecting a touch operation on or near the touch-sensitive surface 231, the touch-sensitive surface 131 transfers the touch operation to the processor 280, so as to determine the type of the touch event. Then, the processor 280 provides a corresponding visual output on the display panel 241 according to the type of the touch event. Although, in FIG. 2, the touch-sensitive surface 231 and the display panel 241 are used as two separate components to implement input and output functions, in some embodiments, the touch-sensitive surface 231 and the display panel 241 may be integrated to implement the input function and output functions.

The control device 200 may further include at least one sensor 250, such as an optical sensor, a motion sensor, and other sensors. Specifically, the optical sensor may include an ambient light sensor and a proximity sensor. The ambient light sensor may adjust luminance of the display panel 241 according to brightness of the ambient light. The proximity sensor may switch off the display panel 241 and/or backlight when the control device 200 is moved to the ear. As one type of motion sensor, a gravity acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock). Other sensor, such as a gyroscope, a barometer, a hygrometer, a thermometer, and an infrared sensor, which may be configured in the control device 200 are not further described herein.

The audio circuit 260, a speaker 221, and a microphone 222 may provide audio interfaces between the user and the control device 200. The audio circuit 260 may transmit an electrical signal, which is converted from received audio data, to the speaker 221. The speaker 221 converts the electrical signal into a sound signal and outputs the sound signal. On the other side, the microphone 222 converts a collected sound signal into an electrical signal. After receiving the electrical signal, the audio circuit 260 converts the electrical signal into audio data, and then outputs the audio data. After being processed by the processor 280, the audio data is sent through the RF circuit 210 to, for example, another control device or the audio data is output to the memory 220 for further processing. The audio circuit 260 may further include an earplug jack, to provide communication between a peripheral earphone and the control device 200.

The short-distance wireless transmission module 270 may be a Wireless Fidelity (WIFI) module, a Bluetooth module, an infrared ray module, or the like. The control device 200 may perform, by using the short-distance wireless transmission module 270, information transmission with a wireless transmission module disposed on a toy battle device.

The processor 280 is a control center of the control device 200, and connects to various parts of the control device by using various interfaces and lines. By running or executing the software program and/or the module stored in the memory 220, and invoking data stored in the memory 220, the processor 180 performs various functions and data processing of the control device 200, thereby performing overall monitoring on the control device. Optionally, the processor 280 may include one or more processing cores. Optionally, the processor 280 may integrate an application processor and a modem processor. The application processor mainly processes an operating system, a user interface, an application program, and the like, and the modem processor mainly processes wireless communication. It may be understood that the modem processor may not be integrated in the processor 280.

The control device 200 further includes the power supply 290 (such as a battery) for supplying power to the components. Preferably, the power supply may logically connect to the processor 280 by using a power supply management system, thereby implementing functions, such as charging, discharging, and power consumption management, by using the power supply management system. The power supply 290 may further include one or more of any component such as a direct current or alternating current power supply, a re-charging system, a power failure detection circuit, a power supply converter or inverter, and a power supply state indicator.

Although not shown in the figure, the control device 200 may further include a camera, a Bluetooth module, and the like, which are not further described herein.

The control device 200 further includes a memory and one or more programs. The one or more programs are stored in the memory and configured to be executed by one or more processors. The programs include instructions for performing various operations on the control device side exemplified in the following methods.

Figure 3A:
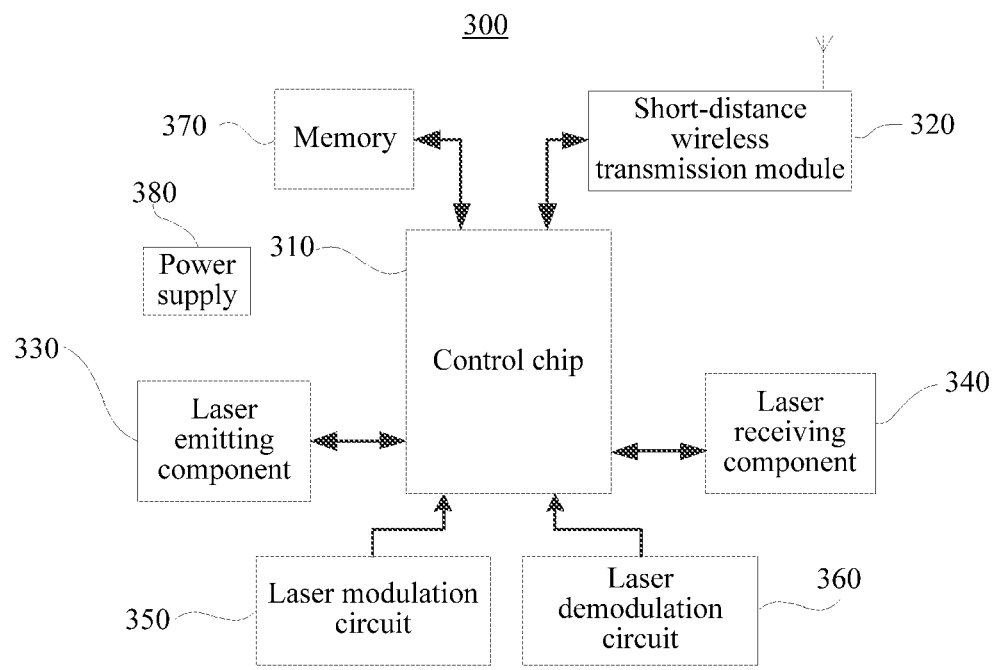
FIG. 3A is a schematic structural diagram of a toy battle device according to an embodiment of the present disclosure.

FIG. 3A is a schematic structural diagram of a toy battle device according to an embodiment of the present disclosure. The toy battle device may be the first toy battle device 120 or the second toy battle device 130 shown in FIG. 1.

The toy battle device 300 includes a control chip 310, a short-distance wireless transmission module 320, a laser emitting component 330, a laser receiving component 340, a laser modulation circuit 350, a laser demodulation circuit 360, a memory 370, and a power supply 380.

The short-distance wireless transmission module 320 may be a Wireless Fidelity (WIFI) module, a Bluetooth module, an infrared ray module, or the like. The toy battle device 300 may perform, by using the short-distance wireless transmission module 320, information transmission with a wireless transmission module disposed on a control device 200.

The laser emitting component 330 may be a laser emitting pipe disposed at the head of the toy battle device 300, and is configured to emit a laser signal modulated by the laser modulation circuit 350. After the toy battle device 300 receives, by using the short-distance wireless transmission module 320, attack information sent by the control device 200, the control chip 310 instructs the laser modulation circuit 350 to modulate the attack information into the laser signal and emit the laser signal by using the laser emitting component 330.

The laser receiving component 340 may be a laser receiving pipe disposed at the tail of the toy battle device 300, and is configured to receive the laser signal emitted by another toy battle device 300 by using the laser emitting component 330. After the control chip 310 detects that the laser receiving component 340 receives the laser signal, the control chip 310 instructs the laser demodulation circuit 360 to obtain the attack information by demodulating the laser signal, and send the attack information to a corresponding control device 200 by using the short-distance wireless transmission module 320.

Each control pin of the control chip 310 is separately connected to the short-distance wireless transmission module 320, the laser emitting component 330, the laser receiving component 340, the laser modulation circuit 350, and the laser demodulation circuit 360, and controls toy battle devices 300 to battle against each other.

The storage medium used by the memory 370 includes solid storage, such as a RAM, a ROM, an EPROM, an EEPROM, or a flash memory; optical storage, such as a CD-ROM, and DVD; and a magnetic storage device, such as a cassette, a tape, and magnetic storage. The memory 370 stores one or more programs, and the programs are configured to be executed by the control chip 310.

The toy battle device 300 further includes the power supply 380 (such as a battery) for supplying power to the components. Preferably, the power supply 380 may logically connect to the control chip 310 by using a power supply management system, thereby implementing functions, such as charging, discharging, and power consumption management, by using the power supply management system. The power supply 380 may further include one or more of any component such as a direct current or alternating current power supply, a re-charging system, a power failure detection circuit, a power supply converter or inverter, and a power supply state indicator.

Figure 3B:
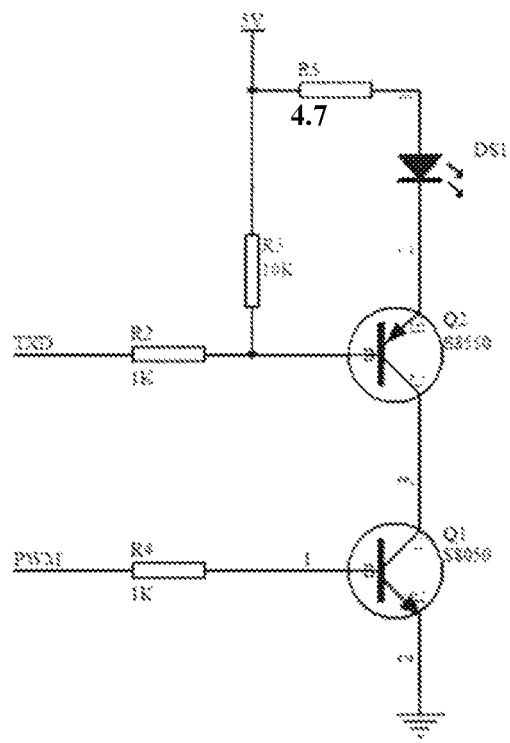
FIG. 3B is a schematic diagram of a laser emitting circuit according to an embodiment of the present disclosure.

In one embodiment, the laser emitting circuit in the toy battle device may be as shown in FIG. 3B. A pulse width modulation (PWM) signal, whose modulation frequency is 180 KHz and duty ratio is 1:3, modulated by a control chip (that is, the control chip 310 in FIG. 3A) in the toy battle device is amplified by a triode Q1 and transmitted to a triode Q2. At the same time, the toy battle device sends received attack information (received by using the short-distance wireless transmission module 320 shown in FIG. 3A) to the triode Q2 by using a transmit data (TXD) pin. The triode Q2 is configured to superimpose the PWM signal amplified by the triode Q1 and the attack information sent by the TXD pin, obtain an impulse current of the superimposed signal, and send the impulse current to a laser emitting pipe DS1 (that is, the laser emitting component 330 shown in FIG. 3A). The laser emitting pipe DS1 converts the impulse current of the superimposed signal into a laser signal, and emits the laser signal. It should be noted that a user may adjust a transmit power of the laser emitting pipe DS1 by adjusting the resistance of R5, so as to control a transmission distance of the laser signal.

As shown in FIG. 3C, the toy battle device further needs to be provided with the laser receiving circuit shown in FIG. 3C. After receiving the laser signal by using the triode Q3, the toy battle device obtains by means of demodulation the attack information carried in the laser signal by using a laser demodulation circuit (that is, the laser demodulation circuit 360 shown in FIG. 3A) inside the toy battle device, and sends the attack information to a control chip (that is, the control chip 310 in FIG. 3A), and the control chip processes the attack information.

Figure 14:
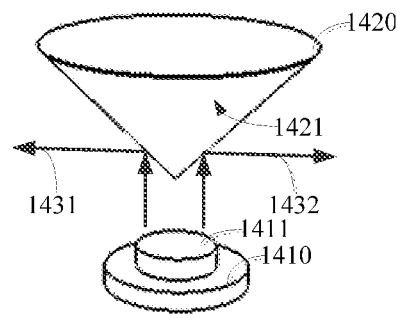
FIG. 14 is a schematic structural diagram of a laser emitting apparatus according to an embodiment of the present disclosure.

FIG. 14 is a schematic structural diagram of a laser emitting apparatus according to an embodiment of the present disclosure. The laser emitting apparatus includes a laser emitting component 1410 and a wide-angle reflective surface component 1420.

The laser emitting component 1410 is configured to emit laser to the wide-angle emitting surface component 1420 in the laser emitting direction.

Optionally, the laser emitting component 1410 is a laser emitting pipe or a laser emitting head, and the type of the laser emitting component 1410 is not limited in the present disclosure.

As shown in FIG. 14, an emit end 1411 of the laser emitting component 1410 emits laser to a reflective surface 1421 of the wide-angle emitting surface component 1420 in the laser emitting direction (an arrow in a bottom-up direction in FIG. 14).

Correspondingly, the wide-angle reflective surface component 1420 receives the laser emitted by the laser emitting component 1410 in the laser emitting direction, and reflects the laser in at least two laser emergent directions, so that a unidirectional laser is projected in multiple directions.

As shown in FIG. 14, after the laser emitted by the laser emitting component 1410 is projected on the reflective surface 1421 of the wide-angle reflective surface component 1420, the laser is reflected on the reflective surface 1421. In FIG. 14, the wide-angle reflective surface component 1420 is an inverted cone. After the laser is reflected by the reflective surface 1421 (that is, a conical surface of the cone), the laser is divided into first laser 1431 and second laser 1432. A laser emergent direction of the first laser 1431 is from right to left, and a laser emergent direction of the second laser 1432 is from left to right. It should be noted that after the laser is reflected by the reflective surface, the laser injects out in all directions of a same plane. In this embodiment, the foregoing two directions are described only as an example, and the present disclosure is not limited thereto.

It should be noted that in this embodiment, a description is provided by using an example in which the wide-angle reflective surface component 1420 is an inverted cone. In other possible implementations, the wide-angle reflective surface component 1420 may be a component that has at least two flat reflective surfaces, such as two mirror surfaces (having two flat reflective surfaces) that form a preset angle and are symmetrically disposed, a regular triangular pyramid component having three flat reflective surfaces, or a right square pyramid component having four flat reflective surfaces. This is not limited in this embodiment of the present disclosure.

Obviously, when a device provided with the laser emitting apparatus shown in FIG. 14 emits laser, after reflected by the wide-angle reflective surface component, unidirectional laser may be simultaneously projected in multiple directions of a same plane. That is, the device can emit laser in multiple directions by disposing only one laser emitting component, significantly decreasing the quantity of laser emitting components in the device, and reducing overall energy consumption of the device.

In this embodiment of the present disclosure, a wide-angle reflective surface component having a laser reflection capability is disposed in a laser emitting direction of a laser emitting component, so that after unidirectional laser is reflected by the wide-angle reflective surface component, the unidirectional laser injects out in multiple laser emergent directions, and one laser emitting apparatus simultaneously emits laser in multiple directions, thereby decreasing the quantity of laser emitting apparatuses on a device, and reducing overall energy consumption of the device.

Contrary to the principle in which the laser emitting apparatus simultaneously emits laser in multiple directions, a laser receiving apparatus provided with a wide-angle reflective surface component reflects laser from all directions of a same plane, so that the laser from different directions is projected on a laser receiving component in a same laser emergent direction, and one laser receiving apparatus simultaneously receives the laser from multiple directions.

Figure 15:
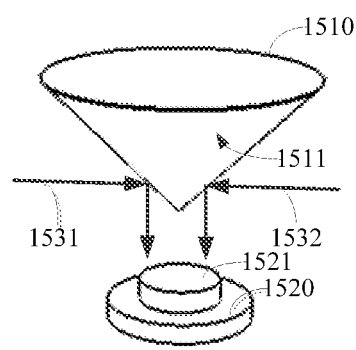
FIG. 15 is a schematic structural diagram of a laser receiving apparatus according to an embodiment of the present disclosure.

FIG. 15 is a schematic structural diagram of a laser receiving apparatus according to an embodiment of the present disclosure. The laser receiving apparatus includes a wide-angle reflective surface component 1510 and a laser receiving component 1520. A laser emergent direction of the wide-angle reflective surface component 1510 is the same as a laser receiving direction of the laser receiving component 1520.

The wide-angle reflective surface component 1510 is configured to reflect laser that is from at least two laser incident directions, in the same laser emergent direction.

As shown in FIG. 15, the wide-angle reflective surface component 1510 is an inverted cone, and a reflective surface 1511 of the wide-angle reflective surface component 1510 is a conical surface of the cone. After first laser 1531 (whose laser incident direction is from left to right) from different laser incident directions of a same plane and second laser 1532 (whose laser incident direction is from right to left) are reflected by the reflective surface 1511, laser emergent directions of the first laser 1531 and the second laser 1532 all change to an up-to-down direction. Similarly, after laser from other laser incident directions of the plane is reflected by the reflective surface 1511, laser emergent directions all change to the up-to-down direction.

It should be noted that in this embodiment, a description is provided by using an example in which the wide-angle reflective surface component 1510 is an inverted cone. In other possible implementations, the wide-angle reflective surface component 1510 may be a component that has at least two flat reflective surfaces, such as two mirror surfaces (having two flat reflective surfaces) that form a preset angle and are symmetrically disposed, a regular triangular pyramid component having three flat reflective surfaces, or a right square pyramid component having four flat reflective surfaces. This is not limited in this embodiment of the present disclosure.

Correspondingly, the laser receiving component 1520 receives, in the laser receiving direction (that is, the laser emergent direction of the wide-angle reflective surface component 1510), laser reflected by the wide-angle reflective surface component 1510.

The laser receiving component 1520 may be a laser receiving pipe or a laser receiving head, and the type of the laser receiving component 1520 is not limited in the present disclosure.

As shown in FIG. 15, the laser receiving component 1520 receives, by using a receive end 1521, laser whose laser emergent direction is from up to down.

Obviously, when a device provided with the laser receiving apparatus shown in FIG. 15 receives laser, the device can simultaneously receive laser from all laser incident directions of a same plane. That is, laser from multiple directions can be simultaneously received by disposing one laser receiving apparatus, significantly decreasing the quantity of laser receiving components in the device, and reducing overall energy consumption of the device.

In conclusion, in this embodiment, a wide-angle reflective surface component having a laser reflection capability is disposed in a laser receiving direction of a laser receiving component, so that after laser from multiple laser incident directions is reflected by the wide-angle reflective surface component, the laser is projected on the laser receiving component in a same laser emergent direction, and one laser receiving apparatus simultaneously receives laser injected from multiple directions, thereby decreasing the quantity of laser receiving apparatuses on a device, and reducing overall energy consumption of the device.

It should be noted that the laser emitting apparatus and the laser receiving apparatus may be combined to form a laser transceiver apparatus. Optionally, when the two apparatuses are combined, the laser receiving component may be made of a transparent material, and the laser emitting component is disposed right below the laser receiving component, so that the laser emitting component can emit laser penetrating through the laser receiving component above. This is not limited in the present disclosure.

To facilitate installation of the laser emitting apparatus and the laser receiving apparatus provided in the foregoing embodiments on a device, the wide-angle reflective surface component and the laser receiving component are disposed in a same cavity, and the wide-angle reflective surface component and the laser emitting component are disposed in the cavity. A description is provided below by using embodiments as examples.

Figure 16A:
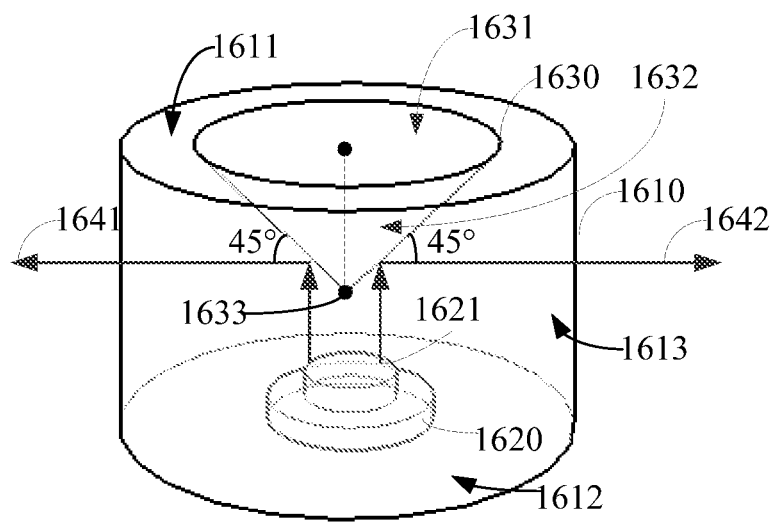
FIG. 16A is a schematic structural diagram of a laser emitting apparatus according to another embodiment of the present disclosure.

FIG. 16A is a schematic structural diagram of a laser emitting apparatus according to another embodiment of the present disclosure. The laser emitting apparatus includes a cavity 1610, and a laser emitting component 1620 and a wide-angle reflective surface component 1630 that are disposed inside the cavity 1610.

The cavity 1610 includes a cavity top surface 1611, a cavity bottom surface 1612 parallel to the cavity top surface 1611, and a cavity side surface 1613 disposed between the cavity top surface 1611 and the cavity bottom surface 1612.

As shown in FIG. 16A, the cavity 1610 has a cylindrical structure. A cylindrical top surface of the cylindrical structure is the cavity top surface 1611, a cylindrical bottom surface of the cylindrical structure is the cavity bottom surface 1612 of the cavity 1610, and a cylindrical surface of the cylindrical structure is the cavity side surface 1613 of the cavity 1610. It should be noted that in this embodiment, a description is provided by using an example in which the cavity 1610 is the cylindrical structure. In other possible implementations, the cavity 1610 may have other polyhedral column structures. This is not limited in the present disclosure.

If a reflective surface of the wide-angle reflective surface component 1630 is an arc-shaped reflective surface, as shown in FIG. 16A, the wide-angle reflective surface component 1630 may have a cone structure. The cone structure includes a conical bottom surface 1631 and a conical surface 1632, and the conical surface 1632 is the arc-shaped reflective surface of the wide-angle reflective surface component 1630.

In FIG. 16A, the conical bottom surface 1631 of the wide-angle reflective surface component 1630 is fixed to the cavity top surface 1611, a fixed end of the laser emitting component 1620 is connected to the cavity bottom surface 1612, and a vertex 1633 of the cone structure faces towards an emit end 1621 of the laser emitting component 1620.

To enable that laser reflected by the wide-angle reflective surface component 1630 injects out in different directions of a same plane, in the cone structure shown in FIG. 16A, an angle between a conical element and the conical bottom surface 1631 is 45°, a laser emitting direction (from down to up) of the laser emitting component 1620 is parallel to a central axis (dashed line inside the cone structure shown in FIG. 163A) of the cone structure, and an angle between the arc-shaped reflective surface (the conical surface 1632) and the laser emitting direction is 45°. After the laser is reflected by the arc-shaped reflective surface, the laser is divided into first laser 1641 (whose laser emergent direction is from right to left) and second laser 1642 (whose laser emergent direction is from left to right). An angle between the laser emergent direction of the first laser 1641 and the arc-shaped reflective surface is 45°, and an angle between the laser emergent direction of the second laser 1642 and the arc-shaped reflective surface is also 45°. Similarly, after the laser emitted by the laser emitting component 1620 is reflected on the arc-shaped reflective surface, the laser emergent direction is perpendicular to the laser incident direction and form an angle of 45° with the arc-shaped reflective surface, so that the reflected laser is in the same plane (parallel to the conical bottom surface 1631)

To enable that the reflected laser can be projected out through the cavity 1610, a pre-determined area of the cavity side surface 1613 of the cavity 1610 is made of a transparent material, and the pre-determined area refers to a projection area of the reflective surface of the wide-angle reflective surface component 1630 on the cavity side surface 1613.

As shown in FIG. 16A, a projection area of the height of the cone structure on the cavity side surface 1613 is made of a transparent material. In addition, to avoid interference from other laser, the cavity top surface 1611 is made of a non-transparent material.

Figure 16B:
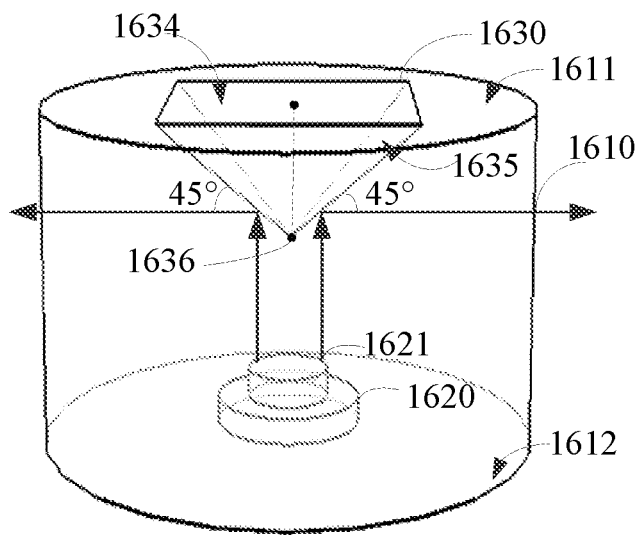
FIG. 16B is a schematic structural diagram of a laser emitting apparatus according to still another embodiment of the present disclosure.

In other possible implementations, the reflective surface of the wide-angle reflective surface component 1630 can not only be the arc-shaped reflective surface, but also be at least two flat reflective surfaces. As shown in FIG. 16B, the wide-angle reflective surface component 1630 has a right square pyramid structure, the right square pyramid structure includes a square pyramidal bottom surface 1634 and four pyramidal surfaces 1635, and the four pyramidal surfaces 1635 are flat reflective surfaces.

The square pyramidal bottom surface 1634 of the wide-angle reflective surface component 1630 is fixed to the cavity top surface 1611, a fixed end of the laser emitting component 1620 is fixed to the cavity bottom surface 1612, and a vertex 1636 of the right square pyramid structure faces towards an emit end 1621 of the laser emitting component 1620.

After laser emitted by the laser emitting component 1620 is reflected on the four pyramidal surfaces 1635, the reflected laser is projected in laser emergent directions corresponding to the four pyramidal surfaces 1635. To enable that the reflected laser is of a same plane, as shown in FIG. 16B, in the right square pyramid structure, an angle between each pyramidal surface 1635 and the square pyramidal bottom surface 1634 is 45°, and a laser emitting direction of the laser emitted by the laser emitting component 1620 is parallel to a central axis (which is a connection line between a central point of the square pyramidal bottom surface 1634 and the vertex 1636 and is represented by dashed lines in the figure) of the right square pyramid structure, and an angle between each flat reflective surface (the pyramidal surface 1635) and the laser emitting direction is 45°. After the laser emitted by the laser emitting component 1620 is reflected by the four flat reflective surfaces, the laser emergent directions are perpendicular to laser incident directions and form an angle of 45° with the flat reflective surfaces, so that the laser injects out in four directions of a same plane.

Obviously, when the laser emitting component uses the right square pyramid structure, the reflected laser injects out in four directions of a same plane. It is easy to consider that when the laser emitting component uses a right n-sided pyramid structure, the reflected laser injects out in n directions of a same plane.

Figure 16C:
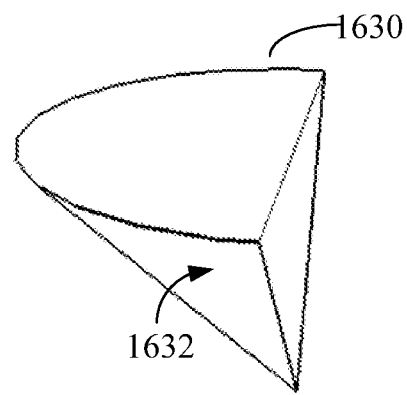
FIG. 16C is a schematic structural diagram of a wide-angle reflective surface component according to still another embodiment of the present disclosure.

When the laser is reflected by using the wide-angle reflective surface component shown in FIG. 16A, the reflected laser injects out in 0-to-360-degree directions. In an actual implementation process, the wide-angle reflective surface component may alternatively use a half or a quarter of the cone structure. When the half of the cone structure is used, the reflected laser injects out in 0-to-180-degree directions. When the quarter of the cone structure is used, the reflected laser injects out in 0-to 90-degree directions. As shown in FIG. 16C, the wide-angle reflective surface component 1630 may be a half of the cone structure. Laser reflected by an arc-shaped emitting surface (a half of the conical surface 1632) of the half of the cone structure injects out in a range of from 0-to-180-degree directions at the left side.

Figure 16D:
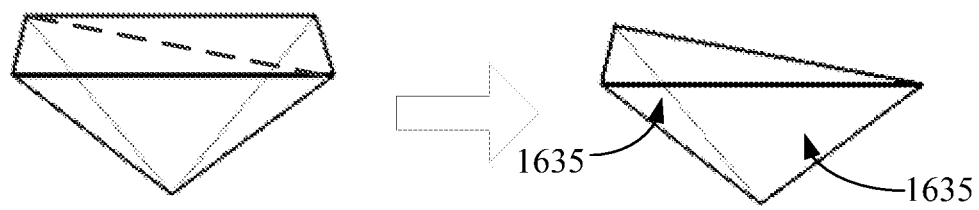
FIG. 16D is a schematic structural diagram of a wide-angle reflective surface component according to still another embodiment of the present disclosure.

Similarly, when the wide-angle reflective surface component uses a right n-sided pyramid structure, the reflected laser injects out in n directions. In an actual implementation process, the wide-angle reflective surface component may reflect the laser by using at least two flat reflective surfaces in the right n-sided pyramid structure, so as to emit laser in multiple specified directions. As shown in FIG. 16D, the wide-angle reflective surface component 1630 may reflect laser by using only two neighboring flat reflective surfaces (the pyramidal surface 1635) in the right square pyramid structure. That is, the wide-angle reflective surface component 1630 projects laser in only two specified directions.

Optionally, a manufacturer may cover a part of reflective surfaces of the wide-angle reflective surface component by using a non-transparent material, so that the wide-angle reflective surface component reflects laser by using an uncovered reflective surface, thereby implementing directional projection of the laser.

In this embodiment, when the wide-angle reflective surface component can simultaneously reflect laser in multiple directions, the wide-angle reflective surface component is controlled to reflect laser in specified multiple directions by means of covering a part of reflective surfaces, thereby implementing precise and directional projection of laser.

As shown in FIG. 17, FIG. 17 is a schematic structural diagram of a laser receiving apparatus according to another embodiment of the present disclosure. The laser receiving apparatus includes a cavity 1710, and a wide-angle reflective surface component 1720 and a laser receiving component 1730 that are disposed inside the cavity 1710.

The cavity 1710 includes a cavity top surface 1711, a cavity bottom surface 1712 parallel to the cavity top surface 1711, and a cavity side surface 1713 disposed between the cavity top surface 1711 and the cavity bottom surface 1712.

Figure 17A:
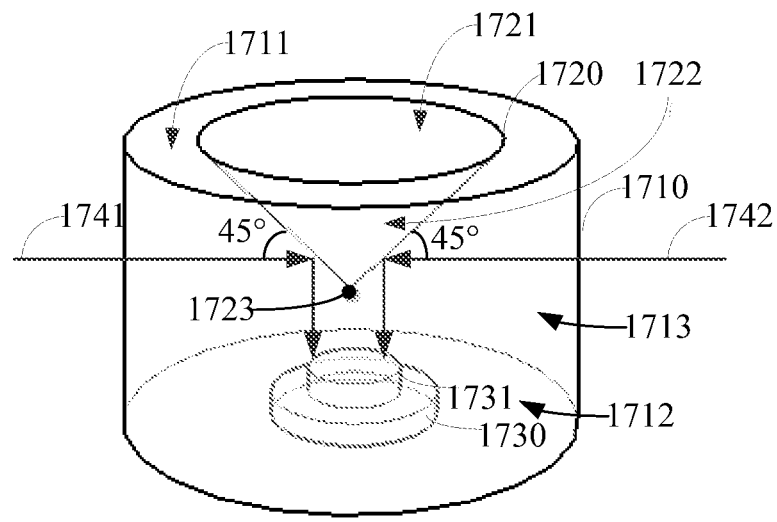
FIG. 17A is a schematic structural diagram of a laser receiving apparatus according to another embodiment of the present disclosure.

As shown in FIG. 17A, the cavity 1710 may have a cylindrical structure. A cylindrical top surface of the cylindrical structure is the cavity top surface 1711, a cylindrical bottom surface of the cylindrical structure is the cavity bottom surface 1712 of the cavity 1710, and a cylindrical surface of the cylindrical structure is the cavity side surface 1713 of the cavity 1710.

If a reflective surface of the wide-angle reflective surface component 1720 is an arc-shaped reflective surface, as shown in FIG. 17A, the wide-angle reflective surface component 1720 may have a cone structure, and the cone structure includes a conical bottom surface 1721 and a conical surface 1722. The conical bottom surface 1721 of the wide-angle reflective surface component 1720 is fixed to the cavity top surface 1711, a fixed end of the laser receiving component 1730 is fixed to the cavity bottom surface 1712, and a vertex 1723 of the cone structure faces towards an emit end 1731 of the laser receiving component 1730.

In FIG. 17A, the conical surface 1722 is the arc-shaped reflective surface of the wide-angle reflective surface component 1720, and an angle between a conical element and the conical bottom surface 1721 is 45°. When laser of different directions on a horizontal plane is injected, an angle between the arc-shaped reflective surface (the conical surface 1722) and the laser incident direction is 45°, and an angle between the laser reflected by the arc-shaped reflective surface and the arc-shaped reflective surface is also 45°.

FIG. 17 includes first laser 1741 (whose laser incident direction is from left to right) and second laser 1742 (whose laser incident direction is from right to left) that are injected from opposite directions of a same plane (a horizontal plane), the first laser 1741 and the second laser 1742 are reflected on the conical surface 1722, a projection direction of the first laser 1741 changes from a left-to-right direction to an up-to-down direction, and a projection direction of the second laser 1742 changes from a right-to-left direction to an up-to-down direction. Similarly, after laser of other directions of this plane is projected on the conical surface 1722, projection directions of the laser all change to up-to-down directions. That is, laser of various laser incident directions of a same plane is projected on the laser receiving component 1730 in a same laser emergent direction.

Figure 17B:
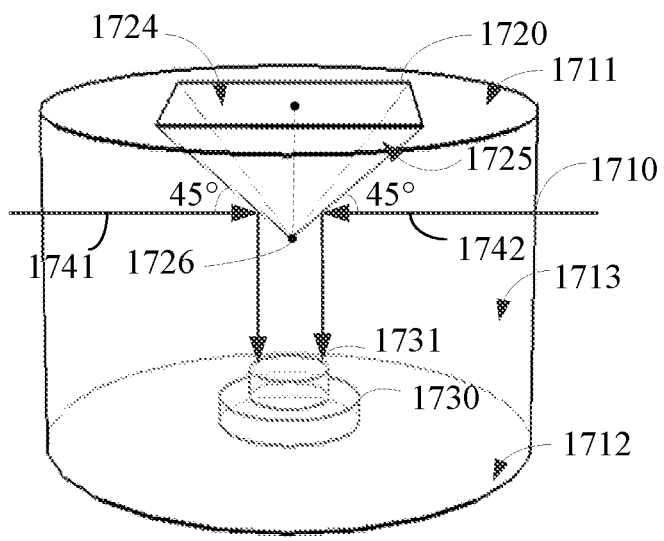
FIG. 17B is a schematic structural diagram of a laser receiving apparatus according to still another embodiment of the present disclosure.

The reflective surface of the wide-angle reflective surface component 1720 may not only be the arc-shaped reflective surface, but also be at least two flat reflective surfaces. As shown in FIG. 17B, the wide-angle reflective surface component 1720 has a right square pyramid structure, the right square pyramid structure includes a square pyramidal bottom surface 1724 and four pyramidal surfaces 1725, and the four pyramidal surfaces 1725 are flat reflective surfaces.

The square pyramidal bottom surface 1724 of the wide-angle reflective surface component 1720 is fixed to the cavity top surface 1711; and a fixed end of the laser receiving component 1730 is fixed to the cavity bottom surface 1712, and a vertex 1726 of the right square pyramid structure faces towards a receive end 1731 of the laser receiving component 1730.

After receiving laser from four directions of a same plane, the wide-angle reflective surface component 1720 reflects the laser by using the four pyramidal surfaces 1725.

After the laser projected on the four pyramidal surfaces 1725 is reflected, the laser is projected on the laser receiving component 1730 in a same laser emergent direction. As shown in FIG. 17B, in the right square pyramid structure, an angle between each pyramidal surface 1725 and the square pyramidal bottom surface 1724 is 45°. An angle between the first laser 1741 (from left to right) on the horizontal plane and the (left) pyramidal surface 1725 is 45°. After the first laser 1741 is reflected by the (left) pyramidal surface 1725, the projection direction changes to an up-to-down direction. An angle between the second laser 1742 (from right to left) on the same horizontal plane and the (right) pyramidal surface 1725 is 45°. After the second laser 1742 is reflected by the (right) pyramidal surface 1725, the projection direction also changes to an up-to-down direction. Similarly, after laser from other directions of a same plane are reflected by a corresponding pyramidal surfaces 1725, laser emergent directions are parallel to a central axis (which is a connection line between a central point of the square pyramidal bottom surface 1724 and the vertex 1726 and represented by dashed lines in the figure) of the right square pyramid structure. Obviously, laser from four directions are reflected by the four pyramidal surfaces 1725, the laser of different directions of the same plane deflect downward by 90° in projection directions, and is projected on a receive side 1731 of the laser receiving component 1730 in a direction of the central axis of the right square pyramid structure, thereby receiving laser from multiple directions.

Similar to the laser emitting apparatus, to enable that external laser can penetrate through the cavity 1710, a pre-determined area of the cavity side surface 1713 of the cavity 1710 is made of a transparent material, and the pre-determined area refers to a projection area of the reflective surface of the wide-angle reflective surface component 1720 on the cavity side surface 1713. In addition, to avoid interference from other laser, the cavity top surface 1711 is made of a non-transparent material.

By using the wide-angle reflective surface component shown in FIG. 17A, the laser receiving apparatus can receive, from 0-to-360-degree directions, laser injected from various directions of a same plane. In an actual implementation process, the wide-angle reflective surface component may alternatively use a half or a quarter of the cone structure. When the half of the cone structure is used, the laser receiving apparatus can receive laser injected from 0-to-180-degree directions corresponding to the half of the cone structure. When the quarter of the cone structure is used, the laser receiving apparatus can receive laser injected from 0-to-90-degree directions corresponding to the quarter of the cone structure.

Similarly, when a right n-sided pyramid structure is used as the wide-angle reflective surface component, the laser receiving apparatus can receive laser injected from n directions. In an actual implementation process, the wide-angle reflective surface component may reflect laser by using at least two planes of the right n-sided pyramid structure, so as to receive laser from specified directions. This is not limited in the present disclosure.

Optionally, a manufacturer may cover a part of reflective surfaces of the wide-angle reflective surface component by using a non-transparent material, so that laser is reflected only by using an uncovered reflective surface and is projected on a laser receiving component, thereby implementing directional receiving of the laser.

In this embodiment, when the wide-angle reflective surface component can simultaneously reflect laser in multiple directions, a specified reflective surface in the wide-angle reflective surface component is controlled to be used for laser reflection by means of covering a part of reflective surfaces, thereby implementing precise and directional receiving of laser.

In one embodiment scenario, the laser emitting apparatus and the laser receiving apparatus provided in the foregoing embodiments may be applied to a toy battle device. That is, a toy battle device may be provided with the laser emitting apparatus and the laser receiving apparatus provided in the foregoing embodiments. By using the laser emitting apparatus and the laser receiving apparatus, the toy battle device can launch a simulated attack to another toy battle device by means of laser (for example, a cannon shot is emitted in a simulated manner by means of the laser and causes damage to the another toy battle device), so as to simulate a real battle effect between the toy battle devices. The toy battle device may be an intelligent battle toy car, an intelligent battle toy plane, or the like.

Figure 18:
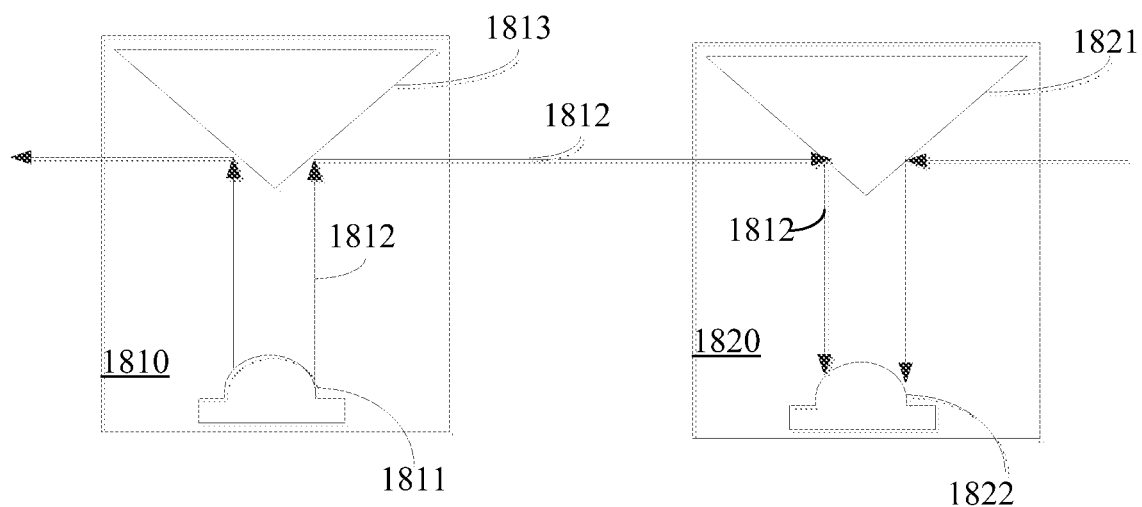
FIG. 18 is a schematic diagram of a process of transmitting laser between a laser emitting apparatus and a laser receiving apparatus according to an embodiment of the present disclosure.

FIG. 18 is a schematic diagram of a process of transmitting laser between a laser emitting apparatus and a laser receiving apparatus according to an embodiment of the present disclosure.

A laser emitting apparatus 1810 is disposed on a first toy battle device, a laser receiving apparatus 1820 is disposed on a second toy battle device, and the laser emitting apparatus 1810 and the laser receiving apparatus 1820 are of a same horizontal height. The first toy battle device emits laser 1812 (straight up) to a wide-angle reflective surface component 1813 by using a laser emitting component 1811, and after the laser 1812 is reflected on a reflective surface 1813, the laser injects out in a horizontal direction. The laser 1812 is projected on a reflective surface 1821 of the wide-angle reflective surface component 1821 in the laser receiving apparatus 1820. After the laser is reflected on the reflective surface 1821, the laser is projected on the laser receiving component 1822 straight downward, and the second toy battle device receives the laser 1812 emitted by the first toy battle device.

In one embodiment, the laser emitting apparatus 1810 and the laser receiving apparatus 1820 may be disposed at a top part of the toy battle device body, or may be disposed at a bottom part of the toy battle device body. Setting positions of the laser emitting apparatus 1810 and the laser receiving apparatus 1820 are not limited in the present disclosure. The toy battle device provided with the laser emitting apparatus and the laser receiving apparatus may emit laser to another toy battle device in all directions by using the laser emitting apparatus, and receive laser emitted by the another toy battle device in all directions by using the laser receiving apparatus.

When the toy battle device needs to transmit data by means of laser, a laser modulation circuit in the toy battle device further needs to be electrically connected to the laser emitting component in the laser emitting apparatus. The toy battle device modulates the laser in advance by using the laser modulation circuit, and then emits the modulated laser by using the laser emitting apparatus. Correspondingly, a laser demodulation circuit in the toy battle device further needs to be electrically connected to the laser receiving component in the laser receiving apparatus. When laser emitted by another toy battle device is received by using the laser receiving component, data carried in the laser is obtained by means of demodulation by using the laser demodulation circuit, thereby implementing data transmission between the toy battle devices. The data carried in the laser includes an attack type, a damage value, an attacking-side identifier, and the like.

Obviously, the toy battle device can receive laser emitted by toy battle devices from all directions by providing with only one laser receiving apparatus, and can emit laser to toy battle devices in all directions by providing with only one laser emitting apparatus. Compared with that multiple laser receiving pipes and laser emitting pipes are disposed on a peripheral side of the toy battle device body, by means of the laser emitting apparatus and the laser receiving apparatus provided in the embodiments of the present disclosure, energy consumption of the toy battle device can be significantly reduced.

Referring back to FIG. 3D1, because a laser beam emitted by the laser emitting component generates a relatively small light spot when the laser beam is projected on another toy battle device, it is difficult for the laser receiving component to receive the laser beam. To improve a receiving rate of the laser receiving component, and decrease the quantity of laser receiving components in the toy battle device, in one embodiment, the front end of a receiving side of the laser receiving component in the toy battle device may further include a light scattering component, to form a laser receiving structure shown in FIG. 3D1.

The laser receiving structure includes a light scattering component 370 and at least one laser receiving component 340.

The light scattering component 370 includes a light inlet surface 3701 and a light outlet surface 3702, and the light scattering component 370 is configured to scatter out, from the light outlet surface 3702, laser injected into the light inlet surface 3701.

The light inlet surface 3701 corresponds to a laser incident direction.

A receiving side 3401 of the at least one laser receiving component 340 is disposed corresponding to the light outlet surface 3702.

To achieve a light scattering effect, in the light scattering component 370, the light inlet surface 3701 is a smooth surface, and the light outlet surface 3702 includes protrusion structures arranged in an array. The protrusion structure has a tapered protrusion structure or a cambered protrusion structure, and the light scattering component is made of a transparent material.

The light scattering component 370 includes a bearing part 371 and several light scattering parts 372 arranged in an array on the bearing part 371.

The bearing part 371 includes a first surface and a second surface. The first surface is parallel to the second surface. The first surface is the light inlet surface 3701 of the light scattering component, and the bearing part 3701 is connected to the several light scattering parts 372 by means of the second surface.

Obviously, as shown in FIG. 3D2, if the laser emitted by the external laser emitting device is not scattered, the projection range (an area within dashed arrows) of the laser is small, and to ensure that the laser receiving component 340 (represented by dashed lines) receives the laser, the laser receiving component 340 needs to be separately disposed at a position A. By means of the light scattering component 370 provided in this embodiment, the laser emitted by the laser emitting component and scattered by the scattering component 370 covers a relatively large projection range (an area within real arrows 132), and the laser receiving component 340 (represented by real lines) disposed between a position B and a position C can receive the scattered laser 132, thereby avoiding setting of an additional laser receiving component 340 at the position A, and reducing the total quantity of laser receiving components. If the laser receiving structure is applied to an electronic device, the quantity of laser receiving components in the electronic device can be greatly decreased, thereby lowering overall energy consumption and manufacturing costs of the electronic device.

As describe above, in this embodiment, a received laser beam is scattered by using a light scattering component in the laser receiving structure, so that the projection range of the laser beam is expanded, and a success rate of receiving laser by a laser receiving component is increased. The quantity of laser receiving components in a device is decreased and overall energy consumption of the device is reduced while ensuring a laser receiving effect.

Referring to FIG. 3E1, the light scattering part 372 may include a connecting surface and a scattering surface. The light scattering part 372 may be connected to the second surface of the bearing part 371 by means of the connecting surface. Scattering surfaces of the several light scattering parts 372 form the light outlet surface 3702 of the light scattering component 370. As shown in FIG. 3E1, the bearing part 371 is a cuboid. An upper surface of the cuboid is the first surface, and a lower surface is the second surface. The light scattering part 372 is a triangular prism. A top surface ABC and a bottom surface abc of the triangular prism each are an isosceles triangle, and AB=CB, and ab=cb. A rectangular cylindrical surface ACca of the triangular prism is the connecting surface, rectangular prismatic surfaces ABba and BCcb each are a scattering surface. The light outlet surface 3702 formed by the scattering surfaces of the light scattering part 372 has a tapered protrusion structure.

Optionally, the scattering part 372 in the light scattering component may be an n-sided pyramid, where n≥3 and n is an integer. As shown in FIG. 3E2, an exemplary description is provided by using an example in which the n-sided pyramid is a triangular pyramid.

The triangular pyramid includes a pyramidal bottom surface ABC and three pyramidal surfaces which are respectively a pyramidal surface ADC, a pyramidal surface ADB, and a pyramidal surface DBC. The pyramidal bottom surface ABC is the connecting surface 37213721 of the light scattering part 372, and the pyramidal bottom surface ABC of the triangular pyramid is fixed to the second surface 372 of the bearing part 371. The pyramidal surface ADC, the pyramidal surface ADB, and the pyramidal surface DBC are the flat scattering surfaces 3702 of the light scattering part 372.

When the triangular prism is used as the scattering part 372, only two surfaces are used as the flat light scattering surface 3702, and when the n-sided pyramid is used as the scattering part 372, n surfaces are used as the light scattering surface 3702, so that the projection range of the scattered laser is expanded.

When the light scattering part 372 uses an n-sided pyramid, where n>3, the n-sided pyramid includes an n-sided pyramidal bottom surface and n pyramidal surfaces. The n-sided pyramidal bottom surface is the connecting surface 3721 of the light scattering part 372, and the n pyramidal surfaces are the flat scattering surfaces 3702 of the light scattering part 372.

During implementation, the n-sided pyramid is used as the light scattering component, so that laser injected into the light scattering component can be scattered on the n flat scattering surfaces, thereby further expanding the projection range of the scattered laser, and reducing the quantity of disposed laser receiving components.

As shown in FIG. 3F1, the bearing part 371 is a cuboid. An upper surface of the cuboid is the first surface, and a lower surface is the second surface. The light scattering part 372 is a half-cylinder, a rectangular cylindrical surface of the half-cylinder is the connecting surface, an arc-shaped cylindrical surface of the half-cylinder is the scattering surface, and the light outlet surface 3702 formed by the scattering surface of the light scattering part 372 has a cambered protrusion structure.

Optionally, as shown in FIG. 3F2, the scattering part 372 may be a hemisphere. A circular bottom surface 3727 of the hemisphere is the connecting surface 37213721 of the scattering part 372. An arc-shaped spherical surface 3728 of the hemisphere is the scattering surface 3702 of the scattering part 372, and laser injected into the scattering part 372 is scattered on the arc-shaped spherical surface 3728.

Optionally, the light scattering part 372 may be a cone, a conical bottom surface of the cone is the connecting surface 37213721 of the light scattering part 372, and a conical surface is the arc-shaped scattering surface 3702 of the light scattering part 372. This is not limited in this embodiment of the present disclosure.

To provide a more detailed description of the embodiments of the present disclosure, the following describes an operating principle of the information processing system provided in the embodiments of the present disclosure, in method embodiments.

Referring to FIG. 4, FIG. 4 is a flowchart of an information processing method according to an embodiment of the present disclosure. An example in which the information processing method is applied to the first control device 110 shown in FIG. 1 is described in this embodiment. The method includes the following steps:

Step 401: Receive attack information set by a user.

The attack information includes at least two attack parameters, and the attack parameters include an attacking-side identifier, an attack type, an attack distance, a damage value, an armor value, and the like.

Step 402: Send the attack information to a first toy battle device, the first toy battle device being corresponding to the first control device; the first toy battle device being configured to: modulate the attack information into a laser signal by using a modulation circuit, and emit the laser signal to a second toy battle device by using a laser emitting component; the second toy battle device being configured to: receive the laser signal by using a laser receiving component, obtain the attack information by demodulating the laser signal by using a demodulation circuit, and send the attack information to a second control device; and the second control device being configured to: determine an attacked status of the second toy battle device according to the attack information, and send a feedback instruction to the second toy battle device, and the feedback instruction being used for indicating the attacked status of the second toy battle device.

In conclusion, according to the information processing method provided in this embodiment, a first control device sends attack information to a corresponding first toy battle device, the first toy battle device modulates the attack information into a laser signal for emitting, a second toy battle device that receives the laser signal sends the attack information that is obtained by means of demodulation, to a corresponding second control device, and the second control device indicates, according to the attack information, that the second toy battle device is in a corresponding attacked status. Problems existing in the existing technology that a toy battle device has a monotonous attack form and relatively high false hit probabilities are resolved. Compared with a conventional attack instruction transmitted by an infrared ray, in this embodiment of the present disclosure, toy battle devices transmit attack information to each other by using a laser signal, the data volume carried in the laser signal is larger, and attack forms of the toy battle devices are enriched. In addition, laser has a small divergence angle and is not easily affected by ambient light, so that a false hit probability caused by diffuse reflection may be significantly decreased.

Figure 5:
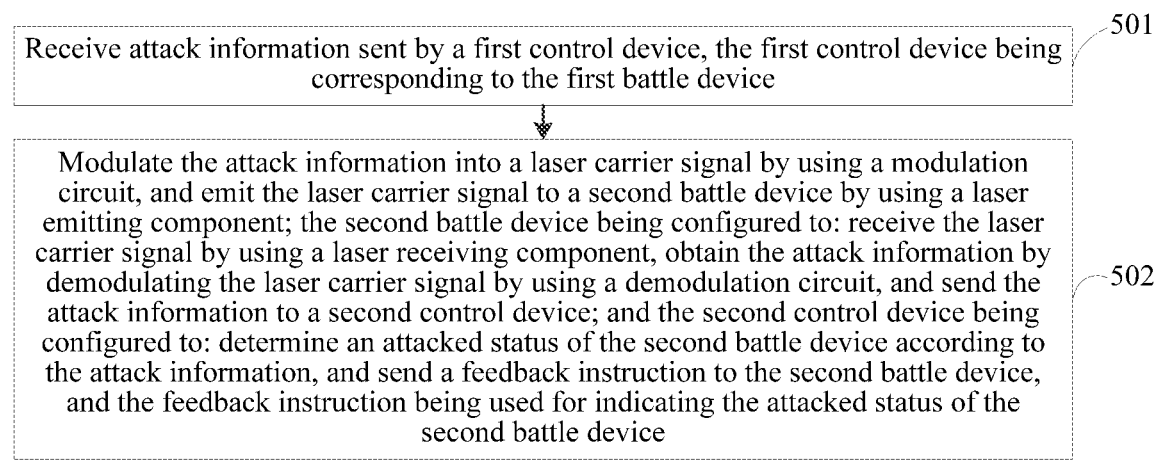
FIG. 5 is a flowchart of an information processing method according to another embodiment of the present disclosure.

Referring to FIG. 5, FIG. 5 is a flowchart of an information processing method according to another embodiment of the present disclosure. An example in which the information processing method is applied to the first toy battle device 120 shown in FIG. 1 is described in this embodiment. The method includes the following steps:

Step 501: Receive attack information sent by a first control device, the first control device being corresponding to the first toy battle device.

The attack information includes at least two attack parameters, and the attack parameters include an attacking-side identifier, an attack type, an attack distance, a damage value, an armor value, and the like.

Step 502: Modulate the attack information into a laser signal by using a modulation circuit, and emit the laser signal to a second toy battle device by using a laser emitting component; the second toy battle device being configured to: receive the laser signal by using a laser receiving component, obtain the attack information by demodulating the laser signal by using a demodulation circuit, and send the attack information to a second control device; and the second control device being configured to: determine an attacked status of the second toy battle device according to the attack information, and send a feedback instruction to the second toy battle device, and the feedback instruction being used for indicating the attacked status of the second toy battle device.

In conclusion, according to the information processing method provided in this embodiment, a first control device sends attack information to a corresponding first toy battle device, the first toy battle device modulates the attack information into a laser signal for emitting, a second toy battle device that receives the laser signal sends the attack information that is obtained by means of demodulation, to a corresponding second control device, and the second control device indicates, according to the attack information, that the second control device is in a corresponding attacked status. Problems existing in the existing technology that a toy battle device has a monotonous attack form and a relatively high false hit probability is resolved. Compared with a conventional attack instruction transmitted by an infrared ray, in this embodiment of the present disclosure, toy battle devices transmit attack information to each other by using a laser signal, the data volume carried in the laser signal is larger, and attack forms of the toy battle devices are enriched. In addition, laser has a small divergence angle and is not easily affected by ambient light, so that a false hit probability caused by diffuse reflection may be significantly decreased.

Referring to FIG. 6, FIG. 6 is a flowchart of an information processing method according to still another embodiment of the present disclosure. An example in which the information processing method is applied to the second toy battle device 130 shown in FIG. 1 is described in this embodiment. The method includes the following steps:

Step 601: Receive, by using a laser receiving component, a laser signal sent by a first toy battle device, the laser signal being emitted by the first toy battle device by using a laser emitting component, after the first toy battle device receives attack information sent by a first control device, and modulates the attack information into the laser signal by using a modulation circuit.

The attack information includes at least two attack parameters, and the attack parameters include an attacking-side identifier, an attack type, an attack distance, a damage value, an armor value, and the like.

Step 602: Obtain the attack information by demodulating the laser signal by using a demodulation circuit, and send the attack information to a second control device.

Step 603: Receive a feedback instruction sent by the second control device according to the attack information, the feedback instruction being used for indicating an attacked status of the second toy battle device.

In conclusion, according to the information processing method provided in this embodiment, a first control device sends attack information to a corresponding first toy battle device, the first toy battle device modulates the attack information into a laser signal for emitting, a second toy battle device that receives the laser signal sends the attack information that is obtained by means of demodulation, to a corresponding second control device, and the second control device indicates, according to the attack information, that the second control device is in a corresponding attacked status. Problems existing in the existing technology that a toy battle device has a monotonous attack form and a relatively high false hit probability is resolved. Compared with a conventional attack instruction transmitted by an infrared ray, in this embodiment of the present disclosure, toy battle devices transmit attack information to each other by using a laser signal, the data volume carried in the laser signal is larger, and attack forms of the toy battle devices are enriched. In addition, laser has a small divergence angle and is not easily affected by ambient light, so that a false hit probability caused by diffuse reflection may be significantly decreased.

Referring to FIG. 7, FIG. 7 is a flowchart of an information processing method according to yet another embodiment of the present disclosure. An example in which the information processing method is applied to the second control device 140 shown in FIG. 1 is described in this embodiment. The method includes the following steps:

Step 701: Receive attack information sent by a second toy battle device, the attack information being obtained by the second toy battle device by demodulating a laser signal by using a demodulation circuit, and the laser signal being emitted by a first toy battle device by using a laser emitting component, after the first toy battle device receives the attack information sent by a first control device, and modulates the attack information by using a modulation circuit.

The attack information includes at least two attack parameters, and the attack parameters include an attacking-side identifier, an attack type, an attack distance, a damage value, an armor value, and the like.

Step 702: Determine an attacked status of the second toy battle device according to the attack information.

Step 703: Send a feedback instruction to the second toy battle device, the feedback instruction being used for indicating the attacked status of the second toy battle device.

In conclusion, according to the information processing method provided in this embodiment, a first control device sends attack information to a corresponding first toy battle device, the first toy battle device modulates the attack information into a laser signal for emitting, a second toy battle device that receives the laser signal sends the attack information that is obtained by means of demodulation, to a corresponding second control device, and the second control device indicates, according to the attack information, that the second control device is in a corresponding attacked status. Problems existing in the existing technology that a toy battle device has a monotonous attack form and a relatively high false hit probability is resolved. Compared with a conventional attack instruction transmitted by an infrared ray, in this embodiment of the present disclosure, toy battle devices transmit attack information to each other by using a laser signal, the data volume carried in the laser signal is larger, and attack forms of the toy battle devices are enriched. In addition, laser has a small divergence angle and is not easily affected by ambient light, so that a false hit probability caused by diffuse reflection may be significantly decreased.

Figure 8A:
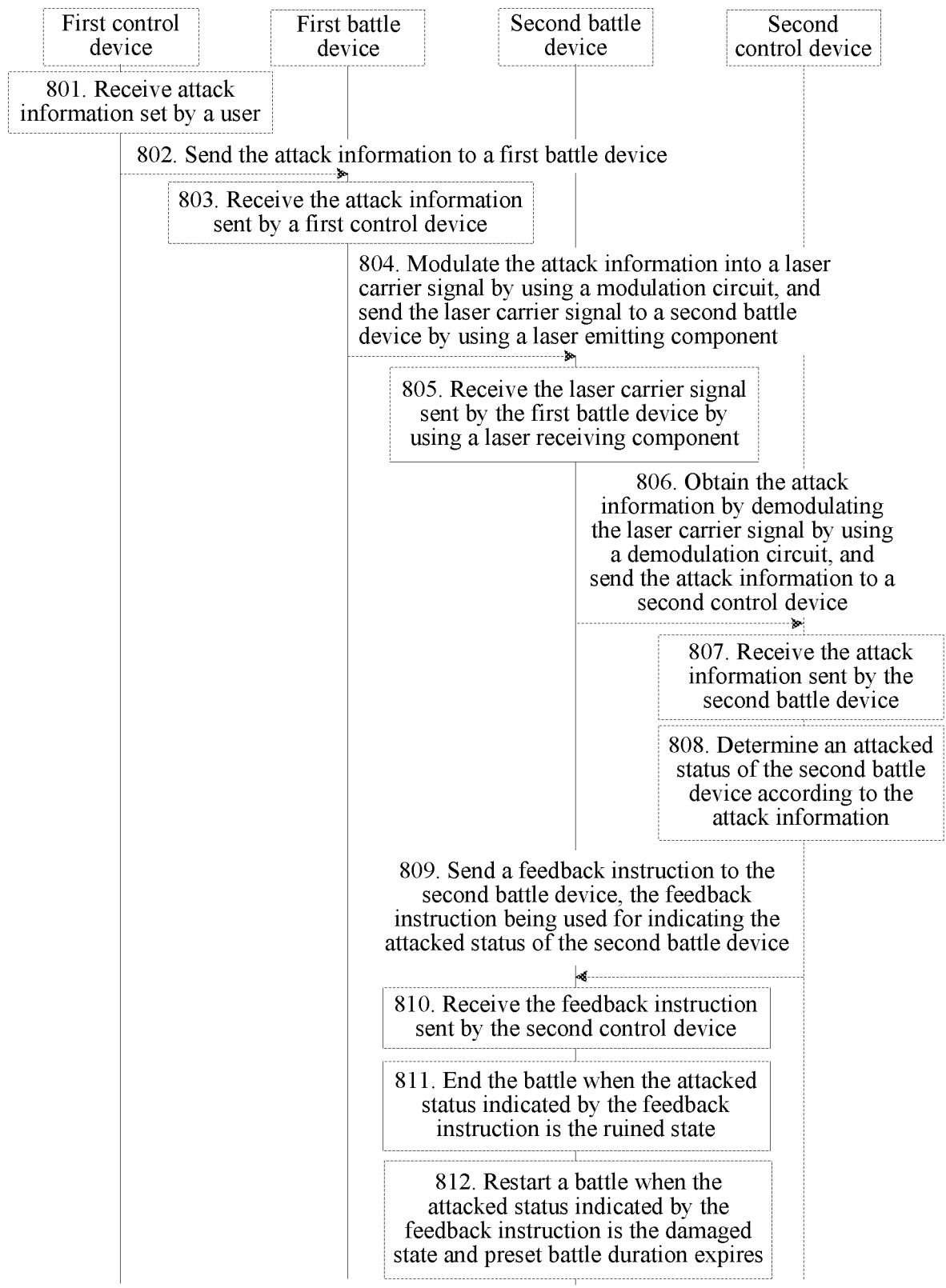
FIG. 8A is a flowchart of an information processing method according to still yet another embodiment of the present disclosure.

Referring to FIG. 8A, FIG. 8A is a flowchart of an information processing method according to still another embodiment of the present disclosure. An example in which the information processing method is applied to the implementation environment shown in FIG. 1 is described in this embodiment. The method includes the following steps:

Step 801: A first control device receives attack information set by a user.

The first control device is provided with an application program used for controlling a toy battle device ("control program" for short below), and is bound to a first toy battle device in advance. In one embodiment manner, both the first control device and the first toy battle device are provided with a Bluetooth module. After the first control device enables the control program and enters a Bluetooth address of the first toy battle device, the first control device is bound to the first toy battle device and performs information transmission by means of Bluetooth.

When the first control device controls, by using the control program, the first toy battle device to battle against another toy battle device, the first control device receives the attack information set by the user. In one embodiment, after the first control device is bound to the first toy battle device, an attack mode in which an attack may be launched by the first toy battle device is displayed. According to the attack mode selected by the user, the first control device determines the attack information corresponding to the attack mode. The attack information may include information such as an attack type, a damage value, and an attack speed.

Figure 8B:
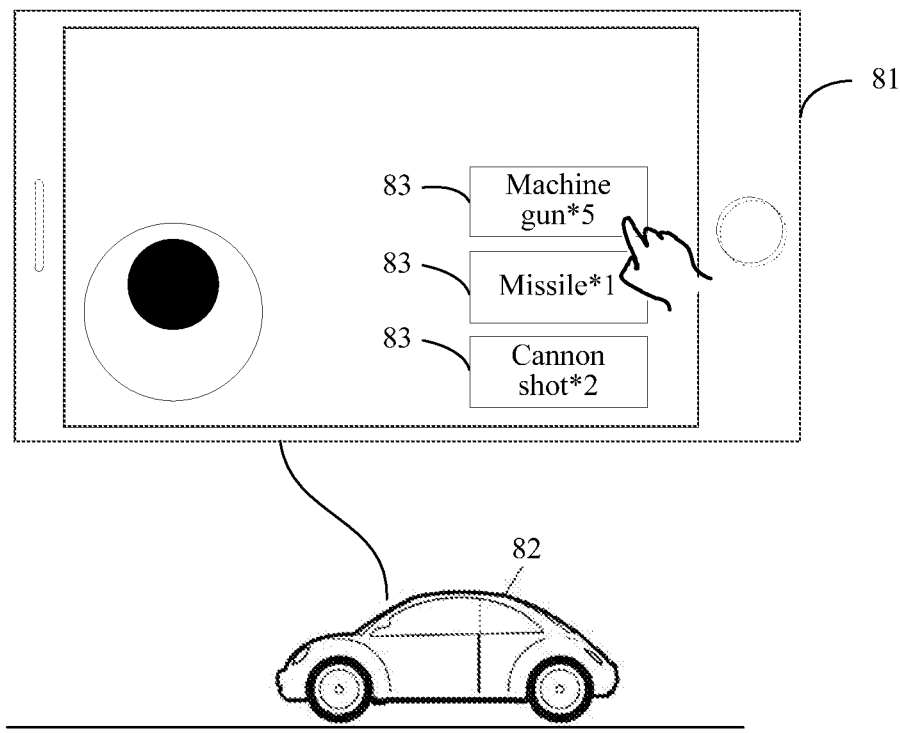
FIG. 8B is a schematic diagram of implementing the method provided in FIG. 8A.

As shown in FIG. 8B, after a first control device 81 is bound to a first toy battle device 82, the first control device 81 displays an attack mode 83 in which the first toy battle device 82 may launch an attack, and receives selection of the user.

Step 802: The first control device sends the attack information to a first toy battle device, the first toy battle device being corresponding to the first control device.

After receiving the attack information set by the user, the first control device sends the attack information to the first toy battle device by means of a connection to the first toy battle device.

Step 803: The first toy battle device receives the attack information sent by the first control device.

Correspondingly, the first toy battle device receives the attack information sent by the first control device by means of the connection.

Step 804: The first toy battle device modulates the attack information into a laser signal by using a modulation circuit, and sends the laser signal to a second toy battle device by using a laser emitting component.

After receiving the attack information, the first toy battle device knows that the first toy battle device needs to launch an attack to another toy battle device. An existing toy battle device simulates a battle by sending an attack instruction by means of an infrared ray. The infrared ray can carry only a small data volume, resulting in that the attack instruction sent by the toy battle device can only instruct the toy battle device to launch an attack, but cannot carry more attack information. However, the first toy battle device provided in this embodiment of the present disclosure is provided with a laser modulation circuit, when receiving the attack information, the first toy battle device can modulates the attack information into the laser signal by using the laser modulation circuit, and emits the laser signal by using the laser emitting component. Compared with the infrared ray, the laser signal can carry much more data volume, so that the laser signal can carry more attack information. For example, a modulated laser signal can carry a device identifier, an attack type, and an attack distance of the first toy battle device.

It should be noted that when emitting the laser signal, the laser emitting component usually emits the laser signal right ahead the laser emitting component. Correspondingly, a laser receiving component only right ahead the laser emitting component can receive the laser signal. In the following steps, a description is provided by using an example in which the laser receiving component on the second toy battle device receives the laser signal.

Step 805: The second toy battle device receives the laser signal sent by the first toy battle device by using a laser receiving component.

When the second toy battle device is right ahead the first toy battle device, the laser signal sent by the first toy battle device by using the laser emitting component is received by the laser receiving component on the second toy battle device.

Step 806: The second toy battle device obtains the attack information by demodulating the laser signal by using a demodulation circuit, and sends the attack information to a second control device.

After the second toy battle device receives the laser signal, the second toy battle device knows that the second toy battle device is attacked by another toy battle device. Corresponding to the laser modulation circuit, a laser demodulation circuit configured to obtain the attack information by demodulating the laser modulation signal is installed in the second toy battle device. After receiving the laser signal, the second toy battle device obtains by means of demodulation the attack information carried in the laser signal by using the laser demodulation circuit, and sends the attack information to a corresponding second control device.

Similar to the wireless connection established between the first toy battle device and the first control device, a wireless connection is also established between the second toy battle device and the second control device, and the second toy battle device sends, by means of the wireless connection, the attack information obtained by means of demodulation to the second control device.

Step 807: The second control device receives the attack information sent by the second toy battle device.

Step 808: The second control device determines an attacked status of the second toy battle device according to the attack information.

After receiving the attack information, the second control device determines the attacked status of the second toy battle device according to a current device state of the second toy battle device and a damage value caused by an attack, indicated by the attack information.

Step 809: The second control device sends a feedback instruction to the second toy battle device, the feedback instruction being used for indicating the attacked status of the second toy battle device.

The second control device sends a corresponding feedback instruction to the second toy battle device according to the determined attacked status. The feedback instruction is used for indicating the corresponding attacked status of the second toy battle device, and the feedback instruction is sent by means of the wireless connection between the second control device and the second toy battle device.

It should be noted that when the attack information carries a device identifier of the first toy battle device, the second control device may further obtain the device identifier, and display the device identifier on a display interface, so that the user knows from which toy battle device an attack is launched, and a corresponding sound effect and vibration may be generated for interaction with the user.

Step 810: The second toy battle device receives the feedback instruction sent by the second control device.

After receiving the feedback instruction, the second toy battle device determines the attacked status indicated by the feedback instruction, and performs a corresponding operation according to the determined attacked status. In one embodiment, the attacked status of the toy battle device includes a destroyed state and a damaged state. When the attacked status indicated by the feedback instruction is the destroyed state, step 811 is performed. When the attacked status indicated by the feedback instruction is the damaged state, step 812 is performed.

Step 811: The second toy battle device ends the battle when the attacked status indicated by the feedback instruction is the destroyed state.

When the second toy battle device determines that the attacked status is the destroyed state, the second toy battle device ends the battle. Optionally, when the attacked status is the destroyed state, the connection between the second toy battle device and the second control device is broken, and the second control device cannot control the second toy battle device.

Step 812: The second toy battle device restarts a battle when the attacked status indicated by the feedback instruction is the damaged state and a preset battle duration expires.

When the second toy battle device determines that the attacked status is the damaged state and the preset battle duration expires, the second toy battle device restarts a new battle. Within the preset duration for ending a battle, the second control device cannot send any instruction to the second toy battle device. The preset duration may be set by the user, or may be automatically set by the second control device according to a damaged status of the second toy battle device. This is not limited in the present disclosure.

It should be noted that after receiving the feedback instruction, the second toy battle device may further simulate actions after an attack, such as turning over, or generate a corresponding sound effect. This is not limited in the present disclosure.

In conclusion, according to the information processing method provided in this embodiment, a first control device sends attack information to a corresponding first toy battle device, the first toy battle device modulates the attack information into a laser signal for emitting, a second toy battle device that receives the laser signal sends the attack information that is obtained by means of demodulation to a corresponding second control device, and the second control device indicates, according to the attack information, that the second control device is in a corresponding attacked status. Problems existing in the existing technology that a toy battle device has a monotonous attack form and a relatively high false hit probability are resolved. Compared with a conventional attack instruction transmitted by an infrared ray, in this embodiment of the present disclosure, toy battle devices transmit attack information to each other by using a laser signal, data volume carried in the laser signal is larger, and attack forms of the toy battle devices are enriched. In addition, laser has a small divergence angle and is not easily affected by ambient light, so that a false hit probability caused by diffuse reflection may be significantly decreased.

In this embodiment, the control device determines, according to the attack information sent by the toy battle device and the current device state of the toy battle device, the attacked status of the toy battle device after the toy battle device is attacked, and sends a corresponding feedback instruction to the toy battle device, thereby implementing interaction between the toy battle device and the control device, and improving realness of the battle.

Figure 8C:
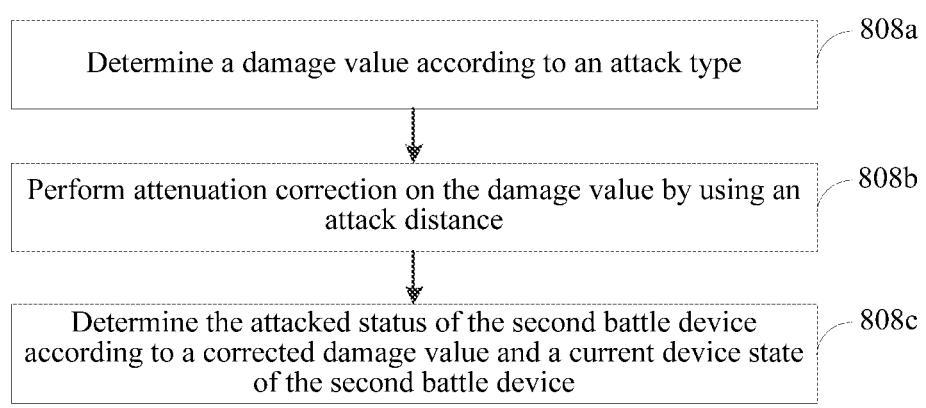
FIG. 8C is a flowchart of a process of correcting a damage value related to the information processing method provided in FIG. 8A.

Because different attack types cause different damages and an attack distance causes an impact on a damage, to simulate the damage caused by an attack more real, the attack information received by the second control device carries an attack type and an attack distance. Optionally, as shown in FIG. 8C, step 808 may include the following sub-steps.

Step 808*a*: The second control device determines a damage value according to an attack type.

The second control device obtains the attack type carried in the attack information, and determines the damage value that causes damage according to the attack type. The second control device may store correspondences between different attack types and damage values. The correspondences may be shown in Table 1 as an example.

TABLE 1

| Attack type | Damage value |
| --- | --- |
| Machine gun | 20 |
| Missile | 60 |
| Cannon shot | 100 |

It should be noted that the first control device may also add the damage value to the attack information. That is, the second control device may directly obtain the damage value, and does not need to search for the damage value according to a damage type. This is not limited in this embodiment of the present disclosure.

Step 808*b*: The second control device performs attenuation correction on the damage value by using an attack distance.

The attack information sent by the first control device further carries the attack distance. The attack distance may be the distance to a front toy battle device obtained by the first toy battle device by using an infrared-ray distance measuring apparatus.

The second control device performs attenuation correction on the damage value determined in step 808*a* according to the attack distance, thereby achieving a more real simulation effect.

In one embodiment, the second control device finds a corresponding damage attenuation formula according to the attack type carried in the attack information. A correspondence between an attack type and a damage attenuation formula may be shown in Table 2 as an example.

TABLE 2

| Attack type | Damage attenuation formula |
| --- | --- |
| Machine gun | $M_1 \times L \times N_1$ |
| Missile | $M_2 \times L \times N_2$ |
| Cannon shot | $M_2 \times L \times N_3$ |

M₁ is a damage value corresponding to a machine gun, and N₁ is a damage attenuation coefficient corresponding to the machine gun. M₂ is a damage value corresponding to a missile, and N₂ is a damage attenuation coefficient corresponding to the missile. M₃ is a damage value corresponding to a cannon shot, and N₃ is a damage attenuation coefficient corresponding to the cannon shot. L is an attack distance.

The second control device substitutes the damage value and the attack distance into a corresponding damage attenuation formula, to calculate a damage value on which attenuation correction has been performed.

It should be noted that when performing correction on the damage value, the second control device may further perform further correction according to a defensive value of the second toy battle device. In one embodiment, when the defensive value is the armor value, the second control device obtains an armor value of the second toy battle device, calculates a corresponding damage exemption percentage according to the armor value, and performs damage exemption calculation on the damage value according to the damage exemption percentage.

For example, a correspondence between an armor value X and a damage exemption percentage α is: α=100/(100+X). The armor value of the second toy battle device obtained by the second control device is 100, and the damage value is 100, and an actual damage value of the second toy battle device obtained through calculation is 100*(1−100/(100+100))=50.

Step 808c: The second control device determines the attacked status of the second toy battle device according to a corrected damage value and a current device state of the second toy battle device.

The second control device maintains the current device state of the second toy battle device, and the current device state includes a current life value. Each time the second toy battle device is attacked; the second control device obtains an updated life value by subtracting the current life value by the damage value caused by the attack, and further determines the attacked status of the second toy battle device according to the updated life value. In one embodiment, step 808c may include the following sub-steps.

Step 808c1: Detect whether the corrected damage value is greater than the current life value included in the current device state.

The second control device detects that whether the damage value obtained after step 808b is greater than the maintained current life value, and when the damage value is greater than the current life value, step 808c2 is performed; or when the damage value is less than the current life value, step 808c3 is performed.

Step 808c2: Determine that the second toy battle device is in a destroyed state, when the corrected damage value is greater than the current life value.

Because the corrected damage value is greater than the current life value, after the current life value is updated by using the damage value, the updated current life value is less than 0, representing that the second toy battle device is ruined, and the second toy battle device should be in the destroyed state.

Step 808c3: Determine that the second toy battle device is in a damaged state, when the corrected damage value is less than the current life value.

Because the corrected damage value is less than the current life value, after the current life value is updated by using the damage value, the updated current life value is greater than 0, representing that the second toy battle device can still be in the battle, and the second toy battle device should be in the damaged state.

Figure 8D:
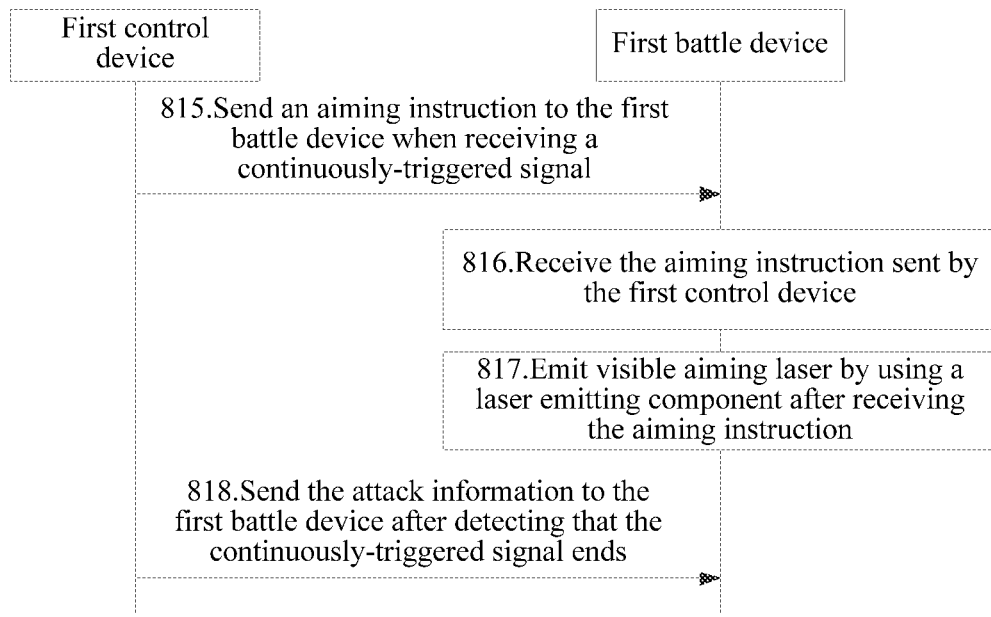
FIG. 8D is a flowchart of an aiming process related to the information processing method provided in FIG. 8A.

Optionally, as shown in FIG. 8D, before step 802, the following substeps may be included.

Step 815: The first control device sends an aiming instruction to the first toy battle device when receiving a continuously-triggered signal.

After receiving the attack information set by the user, the first control device detects whether the continuously-triggered signal is received, and the continuously-triggered signal may be triggered when the user presses a physical key or a virtual key on the first control device. When the continuously-triggered signal is received, the first control device sends the aiming instruction to the first toy battle device.

Figure 8E:
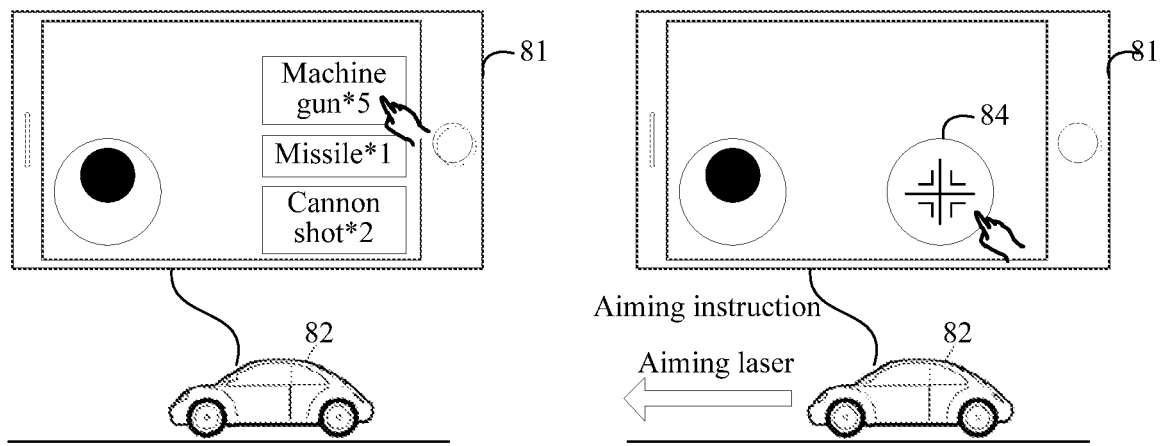
FIG. 8E is a schematic diagram of implementing an aiming process related to the information processing method provided in FIG. 8D.
Figure 8F:
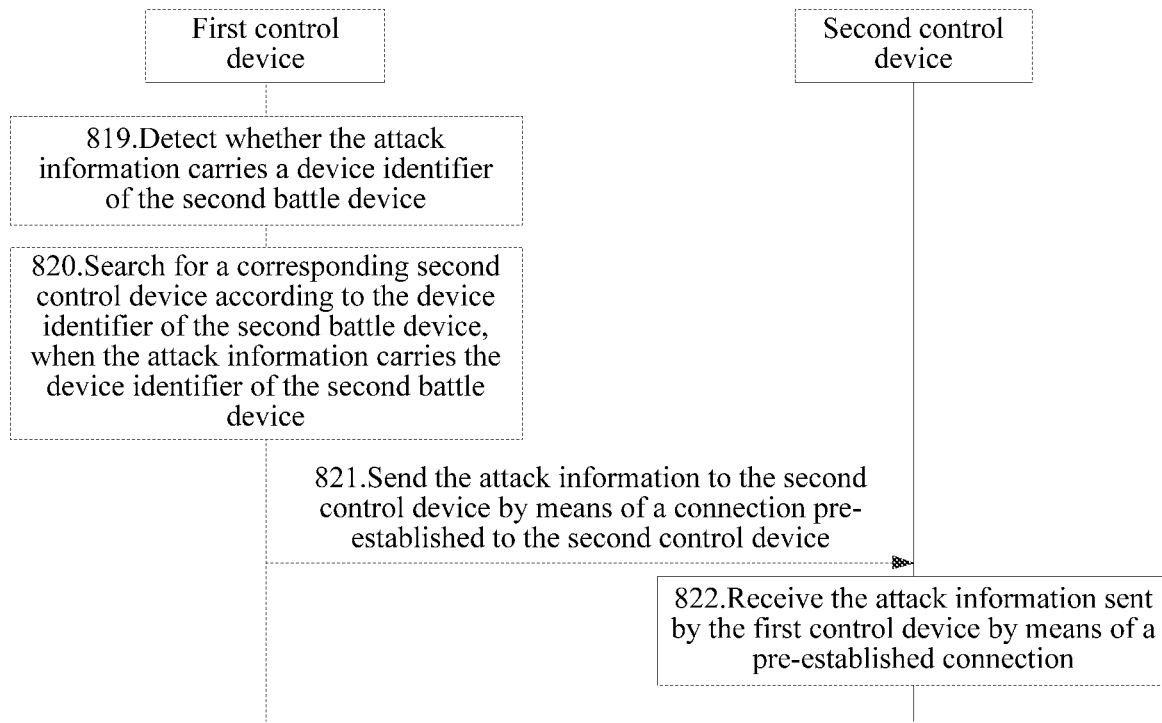
FIG. 8F is a flowchart of a directional attacking process related to the information processing method provided in FIG. 8A.

For example, as shown in FIG. 8E, after receiving the attack information set by the user, the first control device 81 displays a corresponding aiming button 84 on the interface. When the user presses the aiming button 84, the first control device receives the continuously-triggered signal, and sends the aiming instruction to the first toy battle device 82.

Step 816: The first toy battle device receives the aiming instruction sent by the first control device, the aiming instruction being sent by the first control device when the first control device receives the continuously-triggered signal.

Correspondingly, the first toy battle device receives the aiming instruction sent by the first control device.

Step 817: The first toy battle device emits visible aiming laser by using a laser emitting component after receiving the aiming instruction.

After receiving the aiming instruction, the first toy battle device emits forward the aiming laser visible to human eyes by using the laser emitting component. It should be noted that the aiming laser only plays a role of aiming, and does not need to be modulated by the laser modulation circuit.

For example, as shown in FIG. 8E, after receiving the aiming instruction, the first toy battle device 82 emits the aiming laser by using the laser emitting component disposed in the front end of the first toy battle device 82.

Step 818: The first control device sends the attack information to the first toy battle device when detecting that the continuously-triggered signal ends.

When detecting that the continuously-triggered signal ends, which represents that aiming completes, and the first control device sends the attack information to the first toy battle device.

It should be noted that the first control device may send the attack information and the aiming instruction together to the first toy battle device, so that the first toy battle device can modulate the laser signal in an aiming state. When detecting that the continuously-triggered signal ends, the first control device sends a stop-aiming instruction to the first toy battle device. After receiving the stop-aiming instruction, the first toy battle device emits the modulated laser signal by using the laser emitting component.

In this embodiment, when receiving the continuously-triggered signal, the control device sends, to the toy battle device, the aiming instruction that instructs the toy battle device to emit the aiming laser, so that the toy battle device can perform aiming before launching an attack, an attack target is clearer, and a battle effect is more real.

The toy battle devices provided in this embodiment of the present disclosure may launch a non-directional attack or a directional attack against each other. When the non-directional attack is used, because the toy battle devices usually have a relatively small size, there is a probability that the toy battle devices are not hit. When the directional attack is used, the toy battle device can launch an attack to a specified target, and a hit rate of 100 percentages can be ensured. The directional attack is described below by using an embodiment as an example. For ease of description, in this embodiment, a description is provided by using an example in which the specified target toy battle device is the second toy battle device.

As shown in FIG. 8E, after step 801, the following steps may further be included.

Step 819: The first control device detects whether the attack information carries a device identifier of the second toy battle device.

The control program in the first control device may provide two attack modes for a user to select: a directional attack and a non-directional attack. When the user selects the non-directional attack, the attack information received by the first control device does not carry a device identifier of a target toy battle device. When the user selects the directional attack, the user needs to select a corresponding target toy battle device, and the attack information received by the first control device carries a device identifier of a target toy battle device.

After receiving the attack information, the first control device detects whether the attack information carries the device identifier of the target toy battle device. In this embodiment, a description is provided by using an example in which the target toy battle device is the second toy battle device.

When it is detected that the attack information carries the device identifier of the second toy battle device, step 820 to step 822 are performed. When it is detected that the attack information does not carry the device identifier of the second toy battle device, step 802 to step 812 are performed.

Step 820: The first control device searches for a corresponding second control device according to the device identifier of the second toy battle device, when the attack information carries the device identifier of the second toy battle device.

When the attack information carries the device identifier of the second toy battle device, the first control device determines that the attack is a directional attack, and correspondingly, the attack information is directional attack information.

A wireless or wired connection is pre-established between control devices that battle against each other, and each control device stores a device identifier of another control device and a device identifier of a toy battle device corresponding to the another control device. As shown in Table 3, the first control device stores a device identifier of another control devices and a device identifier of a toy battle device corresponding to the another control device.

TABLE 3

| Device identifier of a control device | Device identifier of a toy battle device |
|---|---|
| Control device 2 | Toy battle device 2 |
| Control device 3 | Toy battle device 3 |
| Control device 4 | Toy battle device 4 |

The first control device may find a device identifier of a corresponding second control device according to the device identifier of the second toy battle device.

Step 821: The first control device sends the attack information to the second control device by means of a connection pre-established to the second control device.

Because the first control device establishes a connection to each toy battle device, the first control device directly sends the attack information to the second control device (that is, the directional attack information) according to the found device identifier of the second control device.

Step 822: The second control device receives the attack information sent by the first control device by means of a pre-established connection.

Correspondingly, the second control device receives the attack information sent by the first control device by means of the connection.

Then, the second control device determines an attacked status of the second toy battle device according to the attack information; and sends a feedback instruction to the second toy battle device, the feedback instruction indicating the attacked status of the second toy battle device. The second toy battle device receives the feedback instruction sent by the second control device, and the second toy battle device performs a corresponding operation according to the attacked status indicated by the feedback instruction.

In this embodiment, the control device can not only control the toy battle device to launch a non-directional attack, but also can specify a target toy battle device to launch a directional attack, thereby enriching attack forms of the toy battle device, and improving system performance.

The following is apparatus embodiments of the present disclosure. For details not described in the apparatus embodiments, refer to the foregoing method embodiments that correspond to the apparatus embodiments one by one.

Figure 9:
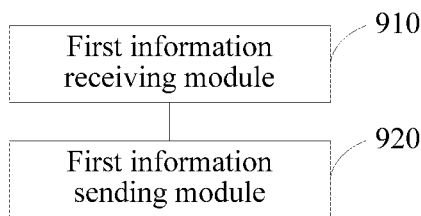
FIG. 9 is a structural block diagram of an information processing apparatus according to an embodiment of the present disclosure.

Referring to FIG. 9, FIG. 9 is a structural block diagram of an information processing apparatus according to an embodiment of the present disclosure. The information processing apparatus has the functions of the first control device side in the foregoing examples of the methods. The functions may be implemented by hardware, or may be implemented by hardware by executing corresponding software. The information processing apparatus includes a first information receiving module 910 and a first information sending module 920.

The first information receiving module 910 is configured to receive attack information set by a user.

The first information sending module 920 is configured to send the attack information to a first toy battle device, the first toy battle device being corresponding to a first control device; the first toy battle device being configured to: modulate the attack information into a laser signal by using a modulation circuit, and emit the laser signal to a second toy battle device by using a laser emitting component; the second toy battle device being configured to: receive the laser signal by using a laser receiving component, obtain the attack information by demodulating the laser signal by using a demodulation circuit, and send the attack information to a second control device; and the second control device being further configured to: determine an attacked status of the second toy battle device according to the attack information, and send a feedback instruction to the second toy battle device, and the feedback instruction being used for indicating the attacked status of the second toy battle device.

In conclusion, according to the information processing apparatus provided in this embodiment, a first control device sends attack information to a corresponding first toy battle device, the first toy battle device modulates the attack information into a laser signal for emitting, a second toy battle device that receives the laser signal sends the attack information that is obtained by means of demodulation, to a corresponding second control device, and the second control device indicates, according to the attack information, that the second control device is in a corresponding attacked status. Problems existing in the existing technology that a toy battle device has a monotonous attack form and relatively high false hit probabilities are resolved. Compared with a conventional attack instruction transmitted by an infrared ray, in this embodiment of the present disclosure, toy battle devices transmit attack information to each other by using a laser signal, the data volume carried in the laser signal is larger, and attack forms of the toy battle devices are enriched. In addition, laser has a small divergence angle and is not easily affected by ambient light, so that a false hit probability caused by diffuse reflection may be significantly decreased.

Figure 10:
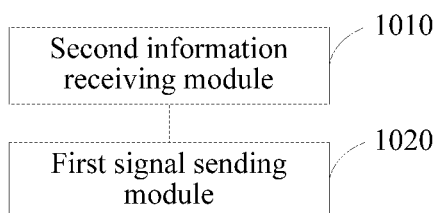
FIG. 10 is a structural block diagram of an information processing apparatus according to another embodiment of the present disclosure.

Referring to FIG. 10, FIG. 10 is a structural block diagram of an information processing apparatus according to an embodiment of the present disclosure. The information processing apparatus has the functions of the first toy battle device side in the foregoing examples of the methods. The functions may be implemented by hardware, or may be implemented by hardware by executing corresponding software. The information processing apparatus includes a second information receiving module 1010 and a first signal sending module 1020.

The second information receiving module 1010 is configured to receive attack information sent by a first control device, the first control device being corresponding to a first toy battle device.

The first signal sending module 1020 is configured to: modulate the attack information into a laser signal by using a modulation circuit, and emit the laser signal to a second toy battle device by using a laser emitting component; the second toy battle device being configured to: receive the laser signal by using a laser receiving component, obtain the attack information by demodulating the laser signal by using a demodulation circuit, and send the attack information to a second control device; and the second control device being configured to: determine an attacked status of the second toy battle device according to the attack information, and send a feedback instruction to the second toy battle device, and the feedback instruction being used for indicating the attacked status of the second toy battle device.

In conclusion, according to the information processing apparatus provided in this embodiment, a first control device sends attack information to a corresponding first toy battle device, the first toy battle device modulates the attack information into a laser signal for emitting, a second toy battle device that receives the laser signal sends the attack information that is obtained by means of demodulation, to a corresponding second control device, and the second control device indicates, according to the attack information, that the second control device is in a corresponding attacked status. Problems existing in the existing technology that a toy battle device has a monotonous attack form and a relatively high false hit probability are resolved. Compared with a conventional attack instruction transmitted by an infrared ray, in this embodiment of the present disclosure, toy battle devices transmit attack information to each other by using a laser signal, data volume carried in the laser signal is larger, and attack forms of the toy battle devices are enriched. In addition, laser has a small divergence angle and is not easily affected by ambient light, so that a false hit probability caused by diffuse reflection may be significantly decreased.

Figure 11:
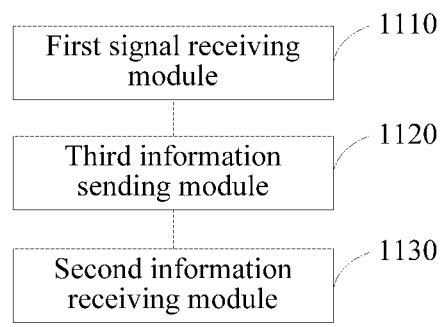
FIG. 11 is a structural block diagram of an information processing apparatus according to still another embodiment of the present disclosure.

Referring to FIG. 11, FIG. 11 is a structural block diagram of an information processing apparatus according to an embodiment of the present disclosure. The information processing apparatus has the functions of the second toy battle device side in the foregoing examples of the methods. The functions may be implemented by hardware, or may be implemented by hardware by executing corresponding software. The information processing apparatus includes a first signal receiving module 1110, a third information sending module 1120, and a second information receiving module 1130.

The first signal receiving module 1110 is configured to receive, by using a laser receiving component, a laser signal sent by a first toy battle device, the laser signal being emitted by the first toy battle device by using a laser emitting component, after the first toy battle device receives attack information sent by a first control device, and modulates the attack information into the laser signal by using a modulation circuit.

The third information sending module 1120 is configured to: obtain the attack information by demodulating the laser signal by using a demodulation circuit, and send the attack information to a second control device.

The second information receiving module 1130 is configured to receive a feedback instruction sent by the second control device according to the attack information, the feedback instruction being used for indicating an attacked status of the second toy battle device.

In conclusion, according to the information processing apparatus provided in this embodiment, a first control device sends attack information to a corresponding first toy battle device, the first toy battle device modulates the attack information into a laser signal for emitting, a second toy battle device that receives the laser signal sends the attack information that is obtained by means of demodulation, to a corresponding second control device, and the second control device indicates, according to the attack information, that the second control device is in a corresponding attacked status. Problems existing in the existing technology that a toy battle device has a monotonous attack form and a relatively high false hit probability are resolved. Compared with a conventional attack instruction transmitted by an infrared ray, in this embodiment of the present disclosure, toy battle devices transmit attack information to each other by using a laser signal, data volume carried in the laser signal is larger, and attack forms of the toy battle devices are enriched. In addition, laser has a small divergence angle and is not easily affected by ambient light, so that a false hit probability caused by diffuse reflection may be significantly decreased.

Figure 12:
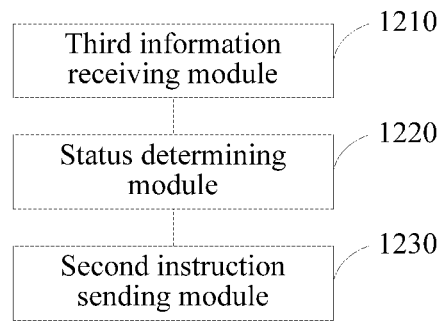
FIG. 12 is a structural block diagram of an information processing apparatus according to yet another embodiment of the present disclosure.

Referring to FIG. 12, FIG. 12 is a structural block diagram of an information processing apparatus according to another embodiment of the present disclosure. The information processing apparatus has the functions of the second control device side in the foregoing examples of the methods. The functions may be implemented by hardware, or may be implemented by hardware by executing corresponding software. The information processing apparatus includes a third information receiving module 1210, a status determining module 1220, and a second instruction sending module 1230.

The third information receiving module 1210 is configured to receive attack information sent by a second toy battle device, the attack information being obtained by the second toy battle device by demodulating a laser signal by using a demodulation circuit, and the laser signal being emitted by a first toy battle device by using a laser emitting component, after the first toy battle device receives the attack information sent by a first control device, and modulates the attack information by using a modulation circuit.

The status determining module 1220 is configured to determine an attacked status of the second toy battle device according to the attack information.

The second instruction sending module 1230 is configured to send a feedback instruction to the second toy battle device, the feedback instruction being used for indicating the attacked status of the second toy battle device.

In conclusion, according to the information processing apparatus provided in this embodiment, a first control device sends attack information to a corresponding first toy battle device, the first toy battle device modulates the attack information into a laser signal for emitting, a second toy battle device that receives the laser signal sends the attack information that is obtained by means of demodulation, to a corresponding second control device, and the second control device indicates, according to the attack information, that the second control device is in a corresponding attacked status. Problems existing in the existing technology that a toy battle device has a monotonous attack form and a relatively high false hit probability are resolved. Compared with a conventional attack instruction transmitted by an infrared ray, in this embodiment of the present disclosure, toy battle devices transmit attack information to each other by using a laser signal, data volume carried in the laser signal is larger, and attack forms of the toy battle devices are enriched. In addition, laser has a small divergence angle and is not easily affected by ambient light, so that a false hit probability caused by diffuse reflection may be significantly decreased.

Figure 13:
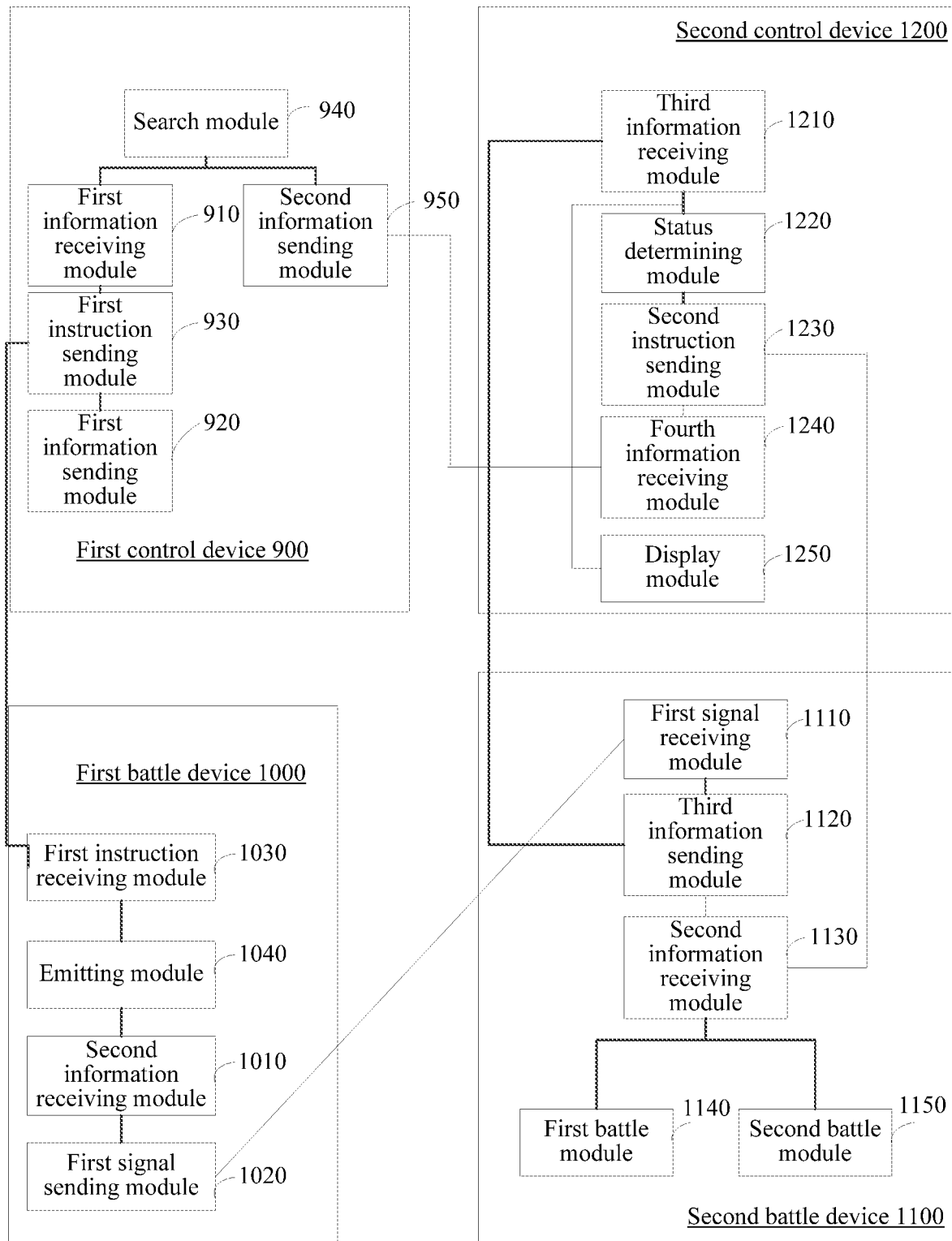
FIG. 13 is a schematic architectural diagram of an information processing system according to an embodiment of the present disclosure.

Referring to FIG. 13, FIG. 13 is a schematic architectural diagram of an information processing system according to an embodiment of the present disclosure. The system includes a first control device 900, a first toy battle device 1000, a second toy battle device 1100, and a second control device 1200.

The first control device 900 includes a first information receiving module 910 and a first information sending module 920.

The first information receiving module 910 is configured to receive attack information set by a user.

The first information sending module 920 is configured to send the attack information to the first toy battle device 1000, the first toy battle device 1000 being corresponding to the first control device 900; the first toy battle device 1000 being configured to: modulate the attack information into a laser signal by using a modulation circuit, and emit the laser signal to a second toy battle device 1100 by using a laser emitting component; the second toy battle device 1100 being configured to: receive the laser signal by using a laser receiving component, obtain the attack information by demodulating the laser signal by using a demodulation circuit, and send the attack information to a second control device 1200; and the second control device 1200 being further configured to: determine an attacked status of the second toy battle device 1100 according to the attack information, and send a feedback instruction to the second toy battle device 1100, and the feedback instruction being used for indicating the attacked status of the second toy battle device 1100.

Optionally, the first control device 900 further includes a first instruction sending module 930.

The first instruction sending module 930 is configured to send an aiming instruction to the first toy battle device 1000 when receiving a continuously-triggered signal, the first toy battle device 1000 being configured to emit visible aiming laser by using the laser emitting component after receiving the aiming instruction.

The first information sending module 920 is configured to send the attack information to the first toy battle device 1000 when detecting that the continuously-triggered signal ends.

Optionally, the attack information carries a device identifier of the second toy battle device 1100.

The first control device 900 further includes a search module 940 and a second information sending module 950.

The search module 940 is configured to search for a corresponding second control device 1200 according to the device identifier of the second toy battle device 1100, when the attack information carries the device identifier of the second toy battle device 1100.

The second information sending module 950 is configured to send the attack information to the second control device 1200 by means of a connection pre-established to the second control device 1200.

The first toy battle device 1000 includes a second information receiving module 1010 and a first signal sending module 1020.

The second information receiving module 1010 is configured to receive attack information sent by a first control device 900, the first control device 900 being corresponding to a first toy battle device 1000.

The first signal sending module 1020 is configured to: modulate the attack information into a laser signal by using a modulation circuit, and emit the laser signal to a second toy battle device 1100 by using a laser emitting component; the second toy battle device 1100 being configured to: receive the laser signal by using a laser receiving component, obtain the attack information by demodulating the laser signal by using a demodulation circuit, and send the attack information to a second control device 1200; and the second control device 1200 being configured to: determine an attacked status of the second toy battle device 1100 according to the attack information, and send a feedback instruction to the second toy battle device 1100, and the feedback instruction being used for indicating the attacked status of the second toy battle device 1100.

Optionally, the first toy battle device 1000 further includes a first instruction receiving module 1030 and an emitting module 1040.

The first instruction receiving module 1030 is configured to receive an aiming instruction sent by the first control device 900, the aiming instruction being sent by the first control device 900 when the first control device 900 receives a continuously-triggered signal.

The emitting module 1040 is configured to emit visible aiming laser by using the laser emitting component after receiving the aiming instruction.

The second toy battle device 1100 includes a first signal receiving module 1110, a third information sending module 1120, and a second information receiving module 1130.

The first signal receiving module 1110 is configured to receive, by using a laser receiving component, a laser signal sent by a first toy battle device 1000, the laser signal being emitted by the first toy battle device 1000 by using a laser emitting component, after the first toy battle device receives attack information emitted by a first control device 900, and modulates the attack information into the laser signal by using a modulation circuit.

The third information sending module 1120 is configured to: obtain the attack information by demodulating the laser signal by using a demodulation circuit, and send the attack information to a second control device 1200.

The second information receiving module 1130 is configured to receive a feedback instruction sent by the second control device 1200 according to the attack information, the feedback instruction being used for indicating an attacked status of the second toy battle device 1100.

Optionally, the attacked status includes a damaged state and a destroyed state.

The second toy battle device 1100 further includes a first battle module 1140 and a second battle module 1150.

The first battle module 1140 is configured to end the battle when the attacked status indicated by the feedback instruction is the destroyed state.

The second battle module 1150 is configured to restart a battle when the attacked status indicated by the feedback instruction is the damaged state and a preset battle duration expires.

The second control device 1200 includes a third information receiving module 1210, a status determining module 1220, and a second instruction sending module 1230.

The third information receiving module 1210 is configured to receive attack information sent by a second toy battle device 1100, the attack information being obtained by the second toy battle device 1100 by demodulating a laser signal by using a demodulation circuit, and the laser signal being emitted by a first toy battle device 1000 by using a laser emitting component, after the first toy battle device 1000 receives the attack information sent by a first control device 900, and modulates the attack information by using a modulation circuit.

The status determining module 1220 is configured to determine an attacked status of the second toy battle device 1100 according to the attack information.

The second instruction sending module 1230 is configured to send a feedback instruction to the second toy battle device 1100, the feedback instruction being used for indicating the attacked status of the second toy battle device 1100.

Optionally, the attack information carries an attack type and an attack distance.

The status determining module 1220 includes a value determining unit, a value correction unit, and a status determining unit (not shown in the figure).

The value determining unit is configured to determine a damage value according to the attack type.

The value correction unit is configured to perform attenuation correction on the damage value by using the attack distance.

The status determining unit is configured to determine the attacked status of the second toy battle device 1100 according to the corrected damage value and a current device state of the second toy battle device 1100.

Optionally, the status determining unit is configured to: detect whether the corrected damage value is greater than a current life value included in the current device state; and determine that the second toy battle device 1100 is in the destroyed state when the corrected damage value is greater than the current life value, or determine that the second toy battle device 1100 is in the damaged state when the corrected damage value is less than the current life value.

Optionally, the attack information carries a device identifier of the second toy battle device 1100. The second control device 1200 further includes a fourth information receiving module 1240.

The fourth information receiving module 1240 is configured to receive the attack information sent by the first control device 900 by using a pre-established connection, the attack information being sent by the first control device 900 after the first control device 900 detects that the attack information set by a user carries the device identifier of the second toy battle device 1100.

Optionally, the attack information carries a device identifier of the first toy battle device 1000. The second control device 1200 further includes a display module 1250.

The display module 1250 is configured to: obtain the device identifier of the first toy battle device 1000 carried in the attack information, and display the device identifier of the first toy battle device 1000 on a display interface.

In conclusion, according to the information processing system provided in this embodiment, a first control device sends attack information to a corresponding first toy battle device, the first toy battle device modulates the attack information into a laser signal for emitting, a second toy battle device that receives the laser signal sends the attack information that is obtained by means of demodulation, to a corresponding second control device, and the second control device indicates, according to the attack information, that the second control device is in a corresponding attacked status. Problems existing in the existing technology that a toy battle device has a monotonous attack form and a relatively high false hit probability are resolved. Compared with a conventional attack instruction transmitted by an infrared ray, in this embodiment of the present disclosure, toy battle devices transmit attack information to each other by using a laser signal, the data volume carried in the laser signal is larger, and attack forms of the toy battle devices are enriched. In addition, laser has a small divergence angle and is not easily affected by ambient light, so that a false hit probability caused by diffuse reflection may be significantly decreased.

In this embodiment, when receiving the continuously-triggered signal, the control device sends, to the toy battle device, the aiming instruction that instructs the toy battle device to emit the aiming laser, so that the toy battle device can perform aiming before launching an attack, an attack target is clearer, and a battle effect is more real.

In this embodiment, the control device determines, according to the attack information sent by the toy battle device and the current device state of the toy battle device, the attacked status of the toy battle device after the toy battle device is attacked, and sends the corresponding feedback instruction to the toy battle device, thereby implementing interaction between the toy battle device and the control device, and improving realness of the battle.

In this embodiment, the control device can not only control the toy battle device to launch a non-directional attack, but also can specify a target toy battle device to launch a directional attack, thereby enriching attack forms of the toy battle device, and improving system performance.

It should be noted that according to the information processing apparatuses provided in the foregoing embodiments, the foregoing division of the functional modules is merely an example for description. During actual application, the foregoing functions may be allocated to and completed by different functional modules as required, that is, inner structures of the first control device, the first toy battle device, the second toy battle device and the second control device are divided into different functional modules, so as to complete all or some of the functions described above. Besides, the information processing apparatuses provided in the foregoing embodiments and the embodiments of the information processing methods belong to one concept. For a specific implementation process, refer to the method embodiments, and details are not are provided herein.

In an exemplary embodiment, a non-transitory computer readable storage medium is further provided, such as a memory including an instruction. The instruction may be executed by a processor of the first control device, so as to perform steps on the first control device side in the foregoing method embodiments; or the instruction may be executed by a processor of the second control device, so as to perform steps on the second control device side in the foregoing method embodiments; or the instruction may be executed by a control chip of the first toy battle device, so as to perform steps on the first toy battle device side in the foregoing method embodiments; or the instruction may be executed by a control chip of the second toy battle device, so as to perform steps on the second toy battle device side in the foregoing method embodiments. For example, the non-transitory computer readable storage medium may be an ROM, a random access memory (RAM), a CD-ROM, a magnetic tape, a floppy disk, an optical data storage device, or the like.

It should be understood that "multiple" described in this specification refers to two or more. "And/or", an association relationship for describing associated objects, represents that three relationships may exist. For example, A and/or B may represent the following three cases: Only A exists, both A and B exist, and only B exists. The character "/" in this specification generally represents an "or" relationship between the associated objects.

The sequence numbers of the foregoing embodiments of the present disclosure are merely for illustrative purposes, and are not intended to indicate priorities of the embodiments.

A person of ordinary skill in the art may understand that all or some of the steps of the embodiments may be implemented by hardware, or a program by instructing related hardware. The program may be stored in a computer readable storage medium. The storage medium may be a read-only memory, a magnetic disk, or an optical disc.

The foregoing descriptions are merely examples of the embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A laser emitting apparatus, the apparatus comprising a laser emitting component and a wide-angle reflective surface component, and a laser emitting direction of the laser emitting component being the same as a laser incident direction of the wide-angle reflective surface component, wherein:
the laser emitting component is configured to emit laser to the wide-angle emitting surface component in the laser emitting direction; and
the wide-angle reflective surface component is configured to receive the laser emitted by the laser emitting component in the laser emitting direction, and reflect the laser in at least two laser emergent directions.

2. The laser emitting apparatus according to claim 1, wherein a reflective surface of the wide-angle reflective surface component is an arc-shaped reflective surface, an angle between the arc-shaped reflective surface and the laser emitting direction is 45°; and an angle between the arc-shaped reflective surface and the laser emergent direction being 45°.

3. The laser emitting apparatus according to claim 1, wherein a reflective surface of the wide-angle reflective surface component includes at least two flat reflective surfaces; and an angle between each flat reflective surface and the laser emitting direction is 45°; and an angle between each flat reflective surface and the laser emergent direction is 45°.

4. The laser emitting apparatus according to claim 1, wherein
the wide-angle reflective surface component has a right n-sided pyramid structure, wherein n≥3 and n is an integer; the right n-sided pyramid structure comprises a right n-sided pyramidal bottom surface and n pyramidal surfaces; and the n pyramidal surfaces form n flat reflective surfaces, the n flat reflective surfaces reflecting the laser that is from the laser incident direction, in n laser emergent directions, and the laser incident direction is parallel to a central axis of the right n-sided pyramid structure.

5. The laser emitting apparatus according to claim 1, wherein
the wide-angle reflective surface component has a cone structure; the cone structure comprises a conical bottom surface and a conical surface; and the conical surface forms the arc-shaped reflective surface, the arc-shaped reflective surface reflecting the laser that is from the laser incident direction, in various laser emergent directions in a same plane, and the laser incident direction is parallel to a central axis of the cone structure.

6. The laser emitting apparatus according to claim 5, wherein the wide-angle reflective surface component and the laser emitting component are disposed inside a same cavity, and the cavity comprises a cavity top surface, a cavity bottom surface parallel to the cavity top surface, and a cavity side surface located between the cavity top surface and the cavity bottom surface; and
if the wide-angle reflective surface component has the right n-sided pyramid structure, the right n-sided pyramidal bottom surface of the wide-angle reflective surface component is fixed to the cavity top surface; a fixed end of the laser emitting component is fixed to the cavity bottom surface; and a vertex of the right n-sided pyramid structure faces towards an emit end of the laser emitting component.

7. The laser emitting apparatus according to claim 6, wherein
a pre-determined area of the cavity side surface is made of a transparent material, and the pre-determined area refers to a projection area of the reflective surface of the wide-angle reflective surface component on the cavity side surface; and
the cavity top surface is made of a non-transparent material.

8. A laser receiving apparatus, the apparatus comprising a wide-angle reflective surface component and a laser receiving component, and a laser emergent direction of the wide-angle reflective surface component being the same as a laser receiving direction of the laser receiving component;
the wide-angle reflective surface component being configured to reflect laser that is from at least two laser incident directions, in the same laser emergent direction; and
the laser receiving component being configured to receive, in the laser receiving direction, the laser reflected by the wide-angle reflective surface component.

9. The laser receiving apparatus according to claim 8, wherein a reflective surface of the wide-angle reflective surface component is an arc-shaped reflective surface or at least two flat reflective surfaces;
an angle between the arc-shaped reflective surface and the laser incident direction is 45°; and an angle between the arc-shaped reflective surface and the laser emergent direction is 45°; and an angle between each flat reflective surface and the laser incident direction is 45°; and an angle between each flat reflective surface and the laser emergent direction is 45°.

10. The laser receiving apparatus according to claim 8, wherein
the wide-angle reflective surface component has a right n-sided pyramid structure, wherein n≥3 and n is an integer; the right n-sided pyramid structure comprises a right n-sided pyramidal bottom surface and n pyramidal surfaces; and the n pyramidal surfaces form n flat reflective surfaces, the n flat reflective surfaces reflecting the laser that is injected from n laser incident directions, in the same laser emergent direction, and the laser emergent direction is parallel to a central axis of the right n-sided pyramid structure.

11. The laser receiving apparatus according to claim 8, wherein
the wide-angle reflective surface component has a cone structure; the cone structure comprises a conical bottom surface and a conical surface; and the conical surface forms the arc-shaped reflective surface, and the arc-shaped reflective surface reflecting the laser that is injected from various laser incident directions of a same plane, in the same laser emergent direction, and the laser incident direction is parallel to a central axis of the cone structure.

12. The laser receiving apparatus according to claim 11, wherein the wide-angle reflective surface component and the laser receiving component are disposed inside a same cavity, and the cavity comprises a cavity top surface, a cavity bottom surface parallel to the cavity top surface, and a cavity side surface located between the cavity top surface and the cavity bottom surface; and
the conical bottom surface of the wide-angle reflective surface component is fixed to the cavity top surface; a fixed end of the laser receiving component is fixed to the cavity bottom surface; and a vertex of the cone structure faces towards an receive end of the laser receiving component.

13. A laser receiving structure, the laser receiving structure comprising a light scattering component and at least one laser receiving component; wherein
the light scattering component comprises a light inlet surface and a light outlet surface, and the light scattering component being configured to scatter out, from the light outlet surface, laser injected into the light inlet surface;
the light inlet surface corresponds to an incident direction of the laser;
a receive end of the at least one laser receiving component corresponds to the light outlet surface; and
the light outlet surface comprising protrusion structures arranged in an array.

14. The laser receiving structure according to claim 13, wherein
the light scattering component is made of a transparent material, the light inlet surface is a smooth surface, and the protrusion structures on the light outlet surface have tapered protrusion structures or cambered protrusion structures.

15. The laser receiving structure according to claim 13, wherein the light scattering component comprises a bearing part and several light scattering parts arranged in an array on the bearing part;
the bearing part comprises a first surface and a second surface, and the first surface is parallel to the second surface; and the first surface is the light inlet surface of the light scattering component, and the second surface of the bearing part is used for bearing the several light scattering parts; and
the light scattering part comprises a connecting surface and a scattering surface; and the connecting surface is fixed to the bearing part, and the scattering surfaces of the several light scattering parts form the light outlet surface of the light scattering component.

16. The laser receiving structure according to claim 15, wherein each light scattering part comprises at least two flat scattering surfaces; and
the light scattering part is an n-sided pyramid, wherein n≥3, and n is an integer; the n-sided pyramid comprises a pyramidal bottom surface and n pyramidal surfaces; and the pyramidal bottom surface is the connecting surface, and the n pyramidal surfaces are the flat scattering surfaces.

17. The laser receiving structure according to claim 15, wherein each the light scattering part is a triangular prism; and the triangular prism comprises a prismatic top surface, a prismatic bottom surface, and three neighboring rectangular prismatic surfaces, and the prismatic top surface and the prismatic bottom surface are isosceles triangles; and a rectangular prismatic surface in which bases of the isosceles triangles are located is the connecting surface, and rectangular prismatic surfaces in which waists of the isosceles triangles are located are the flat scattering surfaces.

18. The laser receiving structure according to claim 15, wherein each light scattering part comprises an arc-shaped scattering surface; and the light scattering part is a half-cylinder; the half-cylinder comprises a cylindrical top surface, a cylindrical bottom surface, an arc-shaped cylindrical surface, and a rectangular cylindrical surface; and the rectangular cylindrical surface is the connecting surface, and the arc-shaped cylindrical surface is the cambered scattering surface.

19. The laser receiving structure according to claim 15, wherein each light scattering part is a hemisphere; and the hemisphere comprises a circular bottom surface and an arc-shaped spherical surface; and the circular bottom surface is the connecting surface, and the arc-shaped spherical surface is the arc-shaped scattering surface.

20. The laser receiving structure according to claim 13, wherein
the at least one laser receiving component is arranged in an array according to a preset interval, the preset interval is positively correlated to the distance between the laser receiving component and the light outlet surface, and the quantity of laser receiving components is inversely correlated to the distance between the laser receiving component and the light outlet surface.

* * * * *